United States Patent
Tajalli

(10) Patent No.: US 10,372,665 B2
(45) Date of Patent: Aug. 6, 2019

(54) MULTIPHASE DATA RECEIVER WITH DISTRIBUTED DFE

(71) Applicant: KANDOU LABS, S.A., Lausanne (CH)

(72) Inventor: Armin Tajalli, Chavannes près Renens (CH)

(73) Assignee: KANDOU LABS, S.A., Lausanne (CH)

( * ) Notice: Subject to any disclaimer, the term of this patent is extended or adjusted under 35 U.S.C. 154(b) by 0 days.

(21) Appl. No.: 15/792,599

(22) Filed: Oct. 24, 2017

(65) Prior Publication Data
US 2018/0113835 A1    Apr. 26, 2018

Related U.S. Application Data

(60) Provisional application No. 62/411,937, filed on Oct. 24, 2016.

(51) Int. Cl.
*G06F 13/42* (2006.01)
*H04L 25/03* (2006.01)

(52) U.S. Cl.
CPC .... *G06F 13/4291* (2013.01); *H04L 25/03267* (2013.01); *H04L 2025/03579* (2013.01); *H04L 2025/03777* (2013.01); *Y02D 10/14* (2018.01); *Y02D 10/151* (2018.01)

(58) Field of Classification Search
CPC ..... H04L 25/03267; H04L 2025/03267; H04L 2025/03777; G06F 13/4291
USPC ......................................................... 375/233
See application file for complete search history.

(56) References Cited

U.S. PATENT DOCUMENTS

| 668,687 | A | 2/1901 | Mayer |
|---|---|---|---|
| 780,883 | A | 1/1905 | Hinchman |
| 3,196,351 | A | 7/1965 | Slepian |
| 3,636,463 | A | 1/1972 | Ongkiehong |
| 3,939,468 | A | 2/1976 | Mastin |

(Continued)

FOREIGN PATENT DOCUMENTS

| CN | 1671092 | 9/2005 |
|---|---|---|
| CN | 1864346 | 11/2006 |

(Continued)

OTHER PUBLICATIONS

"Introduction to: Analog Computers and the DSPACE System," Course Material ECE 5230 Spring 2008, Utah State University, www.coursehero.com, 12 pages.

(Continued)

*Primary Examiner* — Michael R Neff
(74) *Attorney, Agent, or Firm* — Invention Mine LLC

(57) ABSTRACT

Methods and systems are described for receiving an input data voltage signal at a first data decision circuit of set of pipelined data decision circuits, receiving an aggregate decision feedback equalization (DFE) correction current signal from a first analog current summation bus, the aggregate DFE correction current signal comprising a plurality of DFE tap-weighted currents from respective other data decision circuits of the set of pipelined data decision circuits, determining a data output decision value based on the received input data voltage signal and the received aggregate DFE correction current signal, and generating at least one outbound DFE tap-weighted current on at least one other analog current summation bus connected to at least one other data decision circuit of the set of pipelined data decision circuits.

18 Claims, 9 Drawing Sheets

(56) References Cited

U.S. PATENT DOCUMENTS

| | | |
|---|---|---|
| 4,163,258 A | 7/1979 | Ebihara |
| 4,181,967 A | 1/1980 | Nash |
| 4,206,316 A | 6/1980 | Burnsweig |
| 4,276,543 A | 6/1981 | Miller |
| 4,486,739 A | 12/1984 | Franaszek |
| 4,499,550 A | 2/1985 | Ray, III |
| 4,722,084 A | 1/1988 | Morton |
| 4,772,845 A | 9/1988 | Scott |
| 4,774,498 A | 9/1988 | Traa |
| 4,864,303 A | 9/1989 | Ofek |
| 4,897,657 A | 1/1990 | Brubaker |
| 4,974,211 A | 11/1990 | Corl |
| 5,017,924 A | 5/1991 | Guiberteau |
| 5,053,974 A | 10/1991 | Penz |
| 5,166,956 A | 11/1992 | Baltus |
| 5,168,509 A | 12/1992 | Nakamura |
| 5,266,907 A | 11/1993 | Dacus |
| 5,283,761 A | 2/1994 | Gillingham |
| 5,287,305 A | 2/1994 | Yoshida |
| 5,311,516 A | 5/1994 | Kuznicki |
| 5,331,320 A | 7/1994 | Cideciyan |
| 5,412,689 A | 5/1995 | Chan |
| 5,449,895 A | 9/1995 | Hecht |
| 5,459,465 A | 10/1995 | Kagey |
| 5,461,379 A | 10/1995 | Weinman |
| 5,510,736 A | 4/1996 | Van De Plassche |
| 5,511,119 A | 4/1996 | Lechleider |
| 5,553,097 A | 9/1996 | Dagher |
| 5,566,193 A | 10/1996 | Cloonan |
| 5,599,550 A | 2/1997 | Kohlruss |
| 5,626,651 A | 5/1997 | Dullien |
| 5,629,651 A | 5/1997 | Mizuno |
| 5,659,353 A | 8/1997 | Kostreski |
| 5,727,006 A | 3/1998 | Dreyer |
| 5,748,948 A | 5/1998 | Yu |
| 5,802,356 A | 9/1998 | Gaskins |
| 5,825,808 A | 10/1998 | Hershey |
| 5,856,935 A | 1/1999 | Moy |
| 5,875,202 A | 2/1999 | Venters |
| 5,945,935 A | 8/1999 | Kusumoto |
| 5,949,060 A | 9/1999 | Schattschneider |
| 5,982,954 A | 11/1999 | Delen |
| 5,995,016 A | 11/1999 | Perino |
| 6,005,895 A | 12/1999 | Perino |
| 6,084,883 A | 7/2000 | Norrell |
| 6,119,263 A | 9/2000 | Mowbray |
| 6,172,634 B1 | 1/2001 | Leonowich |
| 6,175,230 B1 | 1/2001 | Hamblin |
| 6,232,908 B1 | 5/2001 | Nakaigawa |
| 6,278,740 B1 | 8/2001 | Nordyke |
| 6,316,987 B1 | 11/2001 | Dally |
| 6,346,907 B1 | 2/2002 | Dacy |
| 6,359,931 B1 | 3/2002 | Perino |
| 6,378,073 B1 | 4/2002 | Davis |
| 6,384,758 B1 | 5/2002 | Michalski |
| 6,398,359 B1 | 6/2002 | Silverbrook |
| 6,404,820 B1 | 6/2002 | Postol |
| 6,417,737 B1 | 7/2002 | Moloudi |
| 6,433,800 B1 | 8/2002 | Holtz |
| 6,452,420 B1 | 9/2002 | Wong |
| 6,473,877 B1 | 10/2002 | Sharma |
| 6,483,828 B1 | 11/2002 | Balachandran |
| 6,504,875 B2 | 1/2003 | Perino |
| 6,509,773 B2 | 1/2003 | Buchwald |
| 6,522,699 B1 | 2/2003 | Anderson |
| 6,556,628 B1 | 4/2003 | Poulton |
| 6,563,382 B1 | 5/2003 | Yang |
| 6,621,427 B2 | 9/2003 | Greenstreet |
| 6,624,699 B2 | 9/2003 | Yin |
| 6,650,638 B1 | 11/2003 | Walker |
| 6,661,355 B2 | 12/2003 | Cornelius |
| 6,664,355 B2 | 12/2003 | Kim |
| 6,686,879 B2 | 2/2004 | Shattil |
| 6,690,739 B1 | 2/2004 | Mui |
| 6,766,342 B2 | 7/2004 | Kechriotis |
| 6,772,351 B1 | 8/2004 | Werner |
| 6,839,429 B1 | 1/2005 | Gaikwad |
| 6,839,587 B2 | 1/2005 | Yonce |
| 6,854,030 B2 | 2/2005 | Perino |
| 6,865,234 B1 | 3/2005 | Agazzi |
| 6,865,236 B1 | 3/2005 | Terry |
| 6,876,317 B2 | 4/2005 | Sankaran |
| 6,898,724 B2 | 5/2005 | Chang |
| 6,927,709 B2 | 8/2005 | Kiehl |
| 6,954,492 B1 | 10/2005 | Williams |
| 6,963,622 B2 | 11/2005 | Eroz |
| 6,972,701 B2 | 12/2005 | Jansson |
| 6,973,613 B2 | 12/2005 | Cypher |
| 6,976,194 B2 | 12/2005 | Cypher |
| 6,982,954 B2 | 1/2006 | Dhong |
| 6,990,138 B2 | 1/2006 | Bejjani |
| 6,993,311 B2 | 1/2006 | Li |
| 6,999,516 B1 | 2/2006 | Rajan |
| 7,023,817 B2 | 4/2006 | Kuffner |
| 7,039,136 B2 | 5/2006 | Olson |
| 7,053,802 B2 | 5/2006 | Cornelius |
| 7,075,996 B2 | 7/2006 | Simon |
| 7,080,288 B2 | 7/2006 | Ferraiolo |
| 7,082,557 B2 | 7/2006 | Schauer |
| 7,085,153 B2 | 8/2006 | Ferrant |
| 7,085,336 B2 | 8/2006 | Lee |
| 7,127,003 B2 | 10/2006 | Rajan |
| 7,130,944 B2 | 10/2006 | Perino |
| 7,142,612 B2 | 11/2006 | Horowitz |
| 7,142,865 B2 | 11/2006 | Tsai |
| 7,164,631 B2 | 1/2007 | Tateishi |
| 7,167,019 B2 | 1/2007 | Broyde |
| 7,176,823 B2 | 2/2007 | Zabroda |
| 7,180,949 B2 | 2/2007 | Kleveland |
| 7,184,483 B2 | 2/2007 | Rajan |
| 7,199,728 B2 | 4/2007 | Dally |
| 7,231,558 B2 | 6/2007 | Gentieu |
| 7,269,130 B2 | 9/2007 | Pitio |
| 7,269,212 B1 | 9/2007 | Chau |
| 7,335,976 B2 | 2/2008 | Chen |
| 7,336,112 B1 | 2/2008 | Sha |
| 7,339,990 B2 * | 3/2008 | Hidaka .............. H04L 25/03057 375/233 |
| 7,346,819 B2 | 3/2008 | Bansal |
| 7,348,989 B2 | 3/2008 | Stevens |
| 7,349,484 B2 | 3/2008 | Stojanovic |
| 7,356,213 B1 | 4/2008 | Cunningham |
| 7,358,869 B1 | 4/2008 | Chiarulli |
| 7,362,130 B2 | 4/2008 | Broyde |
| 7,362,697 B2 | 4/2008 | Becker |
| 7,366,942 B2 | 4/2008 | Lee |
| 7,370,264 B2 | 5/2008 | Worley |
| 7,372,390 B2 | 5/2008 | Yamada |
| 7,389,333 B2 | 6/2008 | Moore |
| 7,397,302 B2 | 7/2008 | Bardsley |
| 7,400,276 B1 | 7/2008 | Sotiriadis |
| 7,428,273 B2 | 9/2008 | Foster |
| 7,456,778 B2 | 11/2008 | Werner |
| 7,462,956 B2 | 12/2008 | Lan |
| 7,496,162 B2 | 2/2009 | Srebranig |
| 7,570,704 B2 | 4/2009 | Nagarajan |
| 7,535,957 B2 | 5/2009 | Ozawa |
| 7,539,532 B2 | 5/2009 | Tran |
| 7,599,390 B2 | 10/2009 | Pamarti |
| 7,613,234 B2 | 11/2009 | Raghavan |
| 7,616,075 B2 | 11/2009 | Kushiyama |
| 7,620,116 B2 | 11/2009 | Bessios |
| 7,633,850 B2 | 12/2009 | Nagarajan |
| 7,639,596 B2 | 12/2009 | Cioffi |
| 7,643,588 B2 | 1/2010 | Visalli |
| 7,650,525 B1 | 1/2010 | Chang |
| 7,656,321 B2 | 2/2010 | Wang |
| 7,694,204 B2 | 4/2010 | Schmidt |
| 7,697,915 B2 | 4/2010 | Behzad |
| 7,698,088 B2 | 4/2010 | Sul |
| 7,706,456 B2 | 4/2010 | Laroia |
| 7,706,524 B2 | 4/2010 | Zerbe |
| 7,746,764 B2 | 6/2010 | Rawlins |
| 7,768,312 B2 | 8/2010 | Hirose |

(56) References Cited

U.S. PATENT DOCUMENTS

| | | |
|---|---|---|
| 7,787,572 B2 | 8/2010 | Scharf |
| 7,804,361 B2 | 9/2010 | Lim |
| 7,808,456 B2 | 10/2010 | Chen |
| 7,808,883 B2 | 10/2010 | Green |
| 7,841,909 B2 | 11/2010 | Murray |
| 7,869,497 B2 | 1/2011 | Benvenuto |
| 7,869,546 B2 | 1/2011 | Tsai |
| 7,873,115 B2 | 1/2011 | Zerbe |
| 7,882,413 B2 | 2/2011 | Chen |
| 7,899,653 B2 | 3/2011 | Hollis |
| 7,907,676 B2 | 3/2011 | Stojanovic |
| 7,933,770 B2 | 4/2011 | Kruger |
| 8,000,664 B2 | 8/2011 | Khorram |
| 8,030,999 B2 | 10/2011 | Chatterjee |
| 8,036,300 B2 | 10/2011 | Evans |
| 8,050,332 B2 | 11/2011 | Chung |
| 8,055,095 B2 | 11/2011 | Palotai |
| 8,064,535 B2 | 11/2011 | Wiley |
| 8,085,172 B2 | 12/2011 | Li |
| 8,091,006 B2 | 1/2012 | Prasad |
| 8,106,806 B2 | 1/2012 | Toyomura |
| 8,149,906 B2 | 4/2012 | Saito |
| 8,159,375 B2 | 4/2012 | Abbasfar |
| 8,159,376 B2 | 4/2012 | Abbasfar |
| 8,180,931 B2 | 5/2012 | Lee |
| 8,185,807 B2 | 5/2012 | Oh |
| 8,199,849 B2 | 6/2012 | Oh |
| 8,199,863 B2 | 6/2012 | Chen |
| 8,218,670 B2 | 7/2012 | AbouRjeily |
| 8,233,544 B2 | 7/2012 | Bao |
| 8,245,094 B2 | 8/2012 | Jiang |
| 8,253,454 B2 | 8/2012 | Lin |
| 8,279,094 B2 | 10/2012 | Abbasfar |
| 8,279,745 B2 | 10/2012 | Dent |
| 8,289,914 B2 | 10/2012 | Li |
| 8,295,250 B2 | 10/2012 | Gorokhov |
| 8,295,336 B2 | 10/2012 | Lutz |
| 8,305,247 B2 | 11/2012 | Pun |
| 8,310,389 B1 | 11/2012 | Chui |
| 8,341,492 B2 | 12/2012 | Shen |
| 8,359,445 B2 | 1/2013 | Ware |
| 8,365,035 B2 | 1/2013 | Hara |
| 8,406,315 B2 | 3/2013 | Tsai |
| 8,406,316 B2 | 3/2013 | Sugita |
| 8,429,492 B2 | 4/2013 | Yoon |
| 8,429,495 B2 | 4/2013 | Przybylski |
| 8,437,440 B1 | 5/2013 | Zhang |
| 8,442,099 B1 | 5/2013 | Sederat |
| 8,442,210 B2 | 5/2013 | Zerbe |
| 8,443,223 B2 | 5/2013 | Abbasfar |
| 8,451,913 B2 | 5/2013 | Oh |
| 8,462,891 B2 | 6/2013 | Kizer |
| 8,472,513 B2 | 6/2013 | Malipatil |
| 8,620,166 B2 | 6/2013 | Dong |
| 8,498,344 B2 | 7/2013 | Wilson |
| 8,498,368 B1 | 7/2013 | Husted |
| 8,520,348 B2 | 8/2013 | Dong |
| 8,520,493 B2 | 8/2013 | Goulahsen |
| 8,539,318 B2 | 9/2013 | Cronie |
| 8,547,272 B2 | 10/2013 | Nestler |
| 8,577,284 B2 | 11/2013 | Seo |
| 8,578,246 B2 | 11/2013 | Mittelholzer |
| 8,588,254 B2 | 11/2013 | Diab |
| 8,588,280 B2 | 11/2013 | Oh |
| 8,593,305 B1 | 11/2013 | Tajalli |
| 8,602,643 B2 | 12/2013 | Gardiner |
| 8,604,879 B2 | 12/2013 | Mourant |
| 8,638,241 B2 | 1/2014 | Sudhakaran |
| 8,643,437 B2 | 2/2014 | Chiu |
| 8,649,445 B2 | 2/2014 | Cronie |
| 8,649,460 B2 | 2/2014 | Ware |
| 8,674,861 B2 | 3/2014 | Matsuno |
| 8,687,968 B2 | 4/2014 | Nosaka |
| 8,711,919 B2 | 4/2014 | Kumar |
| 8,718,184 B1 | 5/2014 | Cronie |
| 8,755,426 B1 | 6/2014 | Cronie |
| 8,773,964 B2 | 7/2014 | Hsueh |
| 8,780,687 B2 | 7/2014 | Clausen |
| 8,782,578 B2 | 7/2014 | Tell |
| 8,791,735 B1 | 7/2014 | Shibasaki |
| 8,831,440 B2 | 9/2014 | Yu |
| 8,841,936 B2 | 9/2014 | Nakamura |
| 8,879,660 B1 | 11/2014 | Peng |
| 8,897,134 B2 | 11/2014 | Kern |
| 8,898,504 B2 | 11/2014 | Baumgartner |
| 8,938,171 B2 | 1/2015 | Tang |
| 8,949,693 B2 | 2/2015 | Ordentlich |
| 8,951,072 B2 | 2/2015 | Hashim |
| 8,975,948 B2 | 3/2015 | GonzalezDiaz |
| 8,989,317 B1 | 3/2015 | Holden |
| 9,015,566 B2 | 4/2015 | Cronie |
| 9,020,049 B2 | 4/2015 | Schwager |
| 9,036,764 B1 | 5/2015 | Hossain |
| 9,059,816 B1 | 6/2015 | Simpson |
| 9,069,995 B1 | 6/2015 | Cronie |
| 9,077,386 B1 | 7/2015 | Holden |
| 9,083,576 B1 | 7/2015 | Hormati |
| 9,093,791 B2 | 7/2015 | Liang |
| 9,100,232 B1 | 8/2015 | Hormati |
| 9,106,465 B2 | 8/2015 | Walter |
| 9,124,557 B2 | 9/2015 | Fox |
| 9,148,087 B1 | 9/2015 | Tajalli |
| 9,152,495 B2 | 10/2015 | Losh |
| 9,165,615 B2 | 10/2015 | Amirkhany |
| 9,172,412 B2 | 10/2015 | Kim |
| 9,178,503 B2 | 11/2015 | Hsieh |
| 9,183,085 B1 | 11/2015 | Northcott |
| 9,197,470 B2 | 11/2015 | Okunev |
| 9,281,785 B2 | 3/2016 | Sjoland |
| 9,288,082 B1 | 3/2016 | Ulrich |
| 9,288,089 B2 | 3/2016 | Cronie |
| 9,292,716 B2 | 3/2016 | Winoto |
| 9,300,503 B1 | 3/2016 | Holden |
| 9,306,621 B2 | 4/2016 | Zhang |
| 9,331,962 B2 | 5/2016 | Lida |
| 9,362,974 B2 | 6/2016 | Fox |
| 9,363,114 B2 | 6/2016 | Shokrollahi |
| 9,374,250 B1 | 6/2016 | Musah |
| 9,401,828 B2 | 7/2016 | Cronie |
| 9,432,082 B2 | 8/2016 | Ulrich |
| 9,432,298 B1 | 8/2016 | Smith |
| 9,444,654 B2 | 9/2016 | Hormati |
| 9,455,744 B2 | 9/2016 | George |
| 9,455,765 B2 | 9/2016 | Schumacher |
| 9,461,862 B2 | 10/2016 | Holden |
| 9,479,369 B1 | 10/2016 | Shokrollahi |
| 9,509,437 B2 | 11/2016 | Shokrollahi |
| 9,520,883 B2 | 12/2016 | Shibasaki |
| 9,544,015 B2 | 1/2017 | Ulrich |
| 9,634,797 B2 | 4/2017 | Benammar |
| 9,667,379 B2 | 5/2017 | Cronie |
| 2001/0006538 A1 | 7/2001 | Simon |
| 2001/0055344 A1 | 12/2001 | Lee |
| 2002/0034191 A1 | 3/2002 | Shattil |
| 2002/0044316 A1 | 4/2002 | Myers |
| 2002/0057592 A1 | 5/2002 | Robb |
| 2002/0154633 A1 | 10/2002 | Shin |
| 2002/0163881 A1 | 11/2002 | Dhong |
| 2002/0167339 A1 | 11/2002 | Chang |
| 2002/0174373 A1 | 11/2002 | Chang |
| 2002/0181607 A1 | 12/2002 | Izumi |
| 2003/0016763 A1 | 1/2003 | Doi |
| 2003/0016770 A1 | 1/2003 | Trans |
| 2003/0046618 A1 | 3/2003 | Collins |
| 2003/0085763 A1 | 5/2003 | Schrodinger |
| 2003/0146783 A1 | 8/2003 | Bandy |
| 2003/0174023 A1 | 9/2003 | Miyasita |
| 2003/0185310 A1 | 10/2003 | Ketchum |
| 2003/0218558 A1 | 11/2003 | Mulder |
| 2004/0027185 A1 | 2/2004 | Fiedler |
| 2004/0146117 A1 | 7/2004 | Subramaniam |
| 2004/0155802 A1 | 8/2004 | Lamy |
| 2004/0161019 A1 | 8/2004 | Raghavan |
| 2004/0169529 A1 | 9/2004 | Afghahi |

(56) References Cited

U.S. PATENT DOCUMENTS

| | | |
|---|---|---|
| 2005/0063493 A1 | 3/2005 | Foster |
| 2005/0134380 A1 | 6/2005 | Nairn |
| 2005/0174841 A1 | 8/2005 | Ho |
| 2005/0195000 A1 | 9/2005 | Parker |
| 2005/0201491 A1 | 9/2005 | Wei |
| 2005/0213686 A1 | 9/2005 | Love |
| 2005/0220182 A1 | 10/2005 | Kuwata |
| 2005/0270098 A1 | 12/2005 | Zhang |
| 2006/0036668 A1 | 2/2006 | Jaussi |
| 2006/0097786 A1 | 5/2006 | Su |
| 2006/0103463 A1 | 5/2006 | Lee |
| 2006/0120486 A1 | 6/2006 | Visalli |
| 2006/0126751 A1 | 6/2006 | Bessios |
| 2006/0133538 A1 | 6/2006 | Stojanovic |
| 2006/0140324 A1 | 6/2006 | Casper |
| 2006/0159005 A1 | 7/2006 | Rawlins |
| 2006/0233291 A1 | 10/2006 | Garlepp |
| 2007/0001723 A1 | 1/2007 | Lin |
| 2007/0002954 A1 | 1/2007 | Cornelius |
| 2007/0030796 A1 | 2/2007 | Green |
| 2007/0076871 A1 | 4/2007 | Renes |
| 2007/0103338 A1 | 5/2007 | Teo |
| 2007/0121716 A1 | 5/2007 | Nagarajan |
| 2007/0182487 A1 | 8/2007 | Ozasa |
| 2007/0201546 A1 | 8/2007 | Lee |
| 2007/0204205 A1 | 8/2007 | Niu |
| 2007/0263711 A1 | 11/2007 | Kramer |
| 2007/0283210 A1 | 12/2007 | Prasad |
| 2008/0007367 A1 | 1/2008 | Kim |
| 2008/0012598 A1 | 1/2008 | Mayer |
| 2008/0069198 A1 | 3/2008 | Bhoja |
| 2008/0104374 A1 | 5/2008 | Mohamed |
| 2008/0159448 A1 | 7/2008 | Anim-Appiah |
| 2008/0187037 A1* | 8/2008 | Bulzacchelli ............ G06G 7/18 375/233 |
| 2008/0192621 A1 | 8/2008 | Suehiro |
| 2008/0317188 A1 | 12/2008 | Staszewski |
| 2009/0059782 A1 | 3/2009 | Cole |
| 2009/0115523 A1 | 5/2009 | Akizuki |
| 2009/0154604 A1 | 6/2009 | Lee |
| 2009/0195281 A1 | 8/2009 | Tamura |
| 2009/0262876 A1 | 10/2009 | Arima |
| 2009/0316730 A1 | 12/2009 | Feng |
| 2009/0323864 A1 | 12/2009 | Tired |
| 2010/0020862 A1 | 1/2010 | Peng |
| 2010/0046644 A1 | 2/2010 | Mazet |
| 2010/0081451 A1 | 4/2010 | Mueck |
| 2010/0148819 A1 | 6/2010 | Bae |
| 2010/0180143 A1 | 7/2010 | Ware |
| 2010/0215087 A1 | 8/2010 | Tsai |
| 2010/0215112 A1 | 8/2010 | Tsai |
| 2010/0235673 A1 | 9/2010 | Abbasfar |
| 2010/0271107 A1 | 10/2010 | Tran |
| 2010/0283894 A1 | 11/2010 | Horan |
| 2010/0296556 A1 | 11/2010 | Rave |
| 2010/0309964 A1 | 12/2010 | Oh |
| 2011/0014865 A1 | 1/2011 | Seo |
| 2011/0028089 A1 | 2/2011 | Komori |
| 2011/0032977 A1 | 2/2011 | Hsiao |
| 2011/0051854 A1 | 3/2011 | Kizer |
| 2011/0072330 A1 | 3/2011 | Kolze |
| 2011/0074488 A1 | 3/2011 | Broyde |
| 2011/0084737 A1 | 4/2011 | Oh |
| 2011/0103508 A1 | 5/2011 | Mu |
| 2011/0127990 A1 | 6/2011 | Wilson |
| 2011/0228864 A1 | 9/2011 | Aryanfar |
| 2011/0235501 A1 | 9/2011 | Goulahsen |
| 2011/0268225 A1 | 11/2011 | Cronie |
| 2011/0286497 A1 | 11/2011 | Nervig |
| 2011/0299555 A1 | 12/2011 | Cronie |
| 2011/0302478 A1 | 12/2011 | Cronie |
| 2011/0317559 A1 | 12/2011 | Kern |
| 2012/0082203 A1 | 4/2012 | Zerbe |
| 2012/0133438 A1 | 5/2012 | Tsuchi |
| 2012/0152901 A1 | 6/2012 | Nagorny |
| 2012/0161945 A1 | 6/2012 | Single |
| 2012/0213299 A1 | 8/2012 | Cronie |
| 2012/0257683 A1 | 10/2012 | Schwager |
| 2012/0327993 A1 | 12/2012 | Palmer |
| 2013/0010892 A1 | 1/2013 | Cronie |
| 2013/0013870 A1 | 1/2013 | Cronie |
| 2013/0106513 A1 | 5/2013 | Cyrusian |
| 2013/0114519 A1 | 5/2013 | Gaal |
| 2013/0114663 A1 | 5/2013 | Ding |
| 2013/0129019 A1 | 5/2013 | Sorrells |
| 2013/0147553 A1 | 6/2013 | Iwamoto |
| 2013/0188656 A1 | 7/2013 | Ferraiolo |
| 2013/0195155 A1 | 8/2013 | Pan |
| 2013/0202065 A1 | 8/2013 | Chmelar |
| 2013/0215954 A1 | 8/2013 | Beukema |
| 2013/0259113 A1 | 10/2013 | Kumar |
| 2013/0271194 A1 | 10/2013 | Pellerano |
| 2013/0307614 A1 | 11/2013 | Dai |
| 2013/0314142 A1 | 11/2013 | Tamura |
| 2013/0315501 A1 | 11/2013 | Atanassov |
| 2013/0322512 A1 | 12/2013 | Francese |
| 2013/0346830 A1 | 12/2013 | Ordentlich |
| 2014/0159769 A1 | 6/2014 | Hong |
| 2014/0177645 A1 | 6/2014 | Cronie |
| 2014/0177696 A1 | 6/2014 | Hwang |
| 2014/0266440 A1 | 9/2014 | Itagaki |
| 2014/0269130 A1 | 9/2014 | Maeng |
| 2014/0286381 A1 | 9/2014 | Shibasaki |
| 2015/0049798 A1 | 2/2015 | Hossein |
| 2015/0070201 A1 | 3/2015 | Dedic |
| 2015/0078479 A1 | 3/2015 | Whitby-Strevens |
| 2015/0117579 A1 | 4/2015 | Shibasaki |
| 2015/0146771 A1 | 5/2015 | Walter |
| 2015/0180642 A1 | 6/2015 | Hsieh |
| 2015/0222458 A1 | 8/2015 | Hormati |
| 2015/0249559 A1 | 9/2015 | Shokrollahi |
| 2015/0319015 A1 | 11/2015 | Malhotra |
| 2015/0333940 A1 | 11/2015 | Shokrollahi |
| 2015/0349835 A1 | 12/2015 | Fox |
| 2015/0380087 A1 | 12/2015 | Mittelholzer |
| 2015/0381232 A1 | 12/2015 | Ulrich |
| 2016/0020796 A1 | 1/2016 | Hormati |
| 2016/0020824 A1 | 1/2016 | Ulrich |
| 2016/0036616 A1 | 2/2016 | Holden |
| 2016/0197747 A1 | 7/2016 | Ulrich |
| 2016/0261435 A1 | 9/2016 | Musah |
| 2017/0019276 A1 | 1/2017 | Francese |
| 2017/0310456 A1 | 10/2017 | Tajalli |
| 2017/0317449 A1 | 11/2017 | Shokrollahi |
| 2017/0317855 A1 | 11/2017 | Shokrollahi |
| 2017/0373889 A1 | 12/2017 | Sakai |

FOREIGN PATENT DOCUMENTS

| | | |
|---|---|---|
| CN | 101478286 | 7/2009 |
| EP | 1926267 | 5/2008 |
| EP | 2039221 | 2/2013 |
| JP | 2003163612 | 6/2003 |
| WO | 2005002162 | 1/2005 |
| WO | 2009084121 | 7/2009 |
| WO | 2010031824 | 3/2010 |
| WO | 2011119359 | 9/2011 |

OTHER PUBLICATIONS

Abbasfar, A., "Generalized Differential Vector Signaling", IEEE International Conference on Communications, ICC '09, (Jun. 14, 2009), pp. 1-5.

Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/tcomm.2003.822168, pp. 55-59.

Burr, "Spherical Codes for M-ARY Code Shift Keying", University of York, Apr. 2, 1989, pp. 67-72, United Kingdom.

Cheng, W., "Memory Bus Encoding for Low Power: A Tutorial", Quality Electronic Design, IEEE, International Symposium on Mar. 26-28, 2001, pp. 199-204, Piscataway, NJ.

(56) References Cited

OTHER PUBLICATIONS

Clayton, P., "Introduction to Electromagnetic Compatibility", Wiley-Interscience, 2006.

Counts, L., et al., "One-Chip Slide Rule Works with Logs, Antilogs for Real-Time Processing," Analog Devices Computational Products 6, Reprinted from Electronic Design, May 2, 1985, 7 pages.

Dasilva et al., "Multicarrier Orthogonal CDMA Signals for Quasi-Synchronous Communication Systems", IEEE Journal on Selected Areas in Communications, vol. 12, No. 5 (Jun. 1, 1994), pp. 842-852.

Design Brief 208 Using the Anadigm Multiplier CAM, Copyright 2002 Anadigm, 6 pages.

Ericson, T., et al., "Spherical Codes Generated by Binary Partitions of Symmetric Pointsets", IEEE Transactions on Information Theory, vol. 41, No. 1, Jan. 1995, pp. 107-129.

Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.

Grahame, J., "Vintage Analog Computer Kits," posted on Aug. 25, 2006 in Classic Computing, 2 pages, http.//www.retrothing.com/2006/08/classic_analog_.html.

Healey, A., et al., "A Comparison of 25 Gbps NRZ & PAM-4 Modulation used in Legacy & Premium Backplane Channels", DesignCon 2012, 16 pages.

International Search Report and Written Opinion for PCT/EP2011/059279 dated Sep. 22, 2011.

International Search Report and Written Opinion for PCT/EP2011/074219 dated Jul. 4, 2012.

International Search Report and Written Opinion for PCT/EP2012/052767 dated May 11, 2012.

International Search Report and Written Opinion for PCT/US14/052986 dated Nov. 24, 2014.

International Search Report and Written Opinion from PCT/US2014/034220 dated Aug. 21, 2014.

International Search Report and Written Opinion of the International Searching Authority, dated Jul. 14, 2011 in International Patent Application S.N. PCT/EP2011/002170, 10 pages.

International Search Report and Written Opinion of the International Searching Authority, dated Nov. 5, 2012, in International Patent Application S.N. PCT/EP2012/052767, 7 pages.

International Search Report for PCT/US2014/053563, dated Nov. 11, 2014, 2 pages.

Jiang, A., et al., "Rank Modulation for Flash Memories", IEEE Transactions of Information Theory, Jun. 2006, vol. 55, No. 6, pp. 2659-2673.

Loh, M., et al., "A 3×9 Gb/s Shared, All-Digital CDR for High-Speed, High-Density I/O", Matthew Loh, IEEE Journal of Solid-State Circuits, Vo. 47, No. 3, Mar. 2012.

Notification of Transmittal of International Search Report and the Written Opinion of the International Searching Authority, for PCT/US2015/018363, dated Jun. 18, 2015, 13 pages.

Notification of Transmittal of the International Search Report and the Written Opinion of the International Searching Authority, or the Declaration for PCT/EP2013/002681, dated Feb. 25, 2014, 15 pages.

Notification of Transmittal of the International Search Report and the Written Opinion of the International Searching Authority, or the Declaration, dated Mar. 3, 2015, for PCT/US2014/066893, 9 pages.

Notification of Transmittal of the International Search Report and the Written Opinion of the International Searching Authority, or the Declaration, for PCT/US2014/015840, dated May 20, 2014. 11 pages.

Notification of Transmittal of the International Search Report and the Written Opinion of the International Searching Authority, or the Declaration, for PCT/US2014/043965, dated Oct. 22, 2014, 10 pages.

Notification of Transmittal of the International Search Report and the Written Opinion of the International Searching Authority, or the Declaration, for PCT/US2015/037466, dated Nov. 19, 2015.

Notification of Transmittal of the International Search Report and the Written Opinion of the International Searching Authority, or the Declaration, for PCT/US2015/039952, dated Sep. 23, 2015, 8 pages.

Notification of Transmittal of the International Search Report and the Written Opinion of the International Searching Authority, or the Declaration, for PCT/US2015/041161, dated Oct. 7, 2015, 8 pages.

Notification of Transmittal of the International Search Report and the Written Opinion of the International Searching Authority, or the Declaration, for PCT/US2015/043463, dated Oct. 16, 2015, 8 pages.

Oh, et al., Pseudo-Differential Vector Signaling for Noise Reduction in Single-Ended Signaling, DesignCon 2009.

Poulton, et al., "Multiwire Differential Signaling", UNC-CH Department of Computer Science Version 1.1, Aug. 6, 2003.

Schneider, J., et al., "ELEC301 Project: Building an Analog Computer," Dec. 19, 1999, 8 pages, http://www.clear.rice.edu/elec301/Projects99/anlgcomp/.

She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.

Skliar et al., A Method for the Analysis of Signals: the Square-Wave Method, Mar. 2008, Revista de Matematica: Teoria y Aplicationes, pp. 109-129.

Slepian, D., "Premutation Modulation", IEEE, vol. 52, No. 3, Mar. 1965, pp. 228-236.

Stan, M., et al., "Bus-Invert Coding for Low-Power I/O, IEEE Transactions on Very Large Scale Integration (VLSI) Systems", vol. 3, No. 1, Mar. 1995, pp. 49-58.

Tallini, L., et al., "Transmission Time Analysis for the Parallel Asynchronous Communication Scheme", IEEE Transactions on Computers, vol. 52, No. 5, May 2003, pp. 558-571.

Tierney, J., et al., "A digital frequency synthesizer," Audio and Electroacoustics, IEEE Transactions, Mar. 1971, pp. 48-57, vol. 19, Issue 1, 1 page Abstract from http://ieeexplore.

Wang et al., "Applying CDMA Technique to Network-on-Chip", IEEE Transactions on Very Large Scale Integration (VLSI) Systems, vol. 15, No. 10 (Oct. 1, 2007), pp. 1091-1100.

Zouhair Ben-Neticha et al, "The streTched-Golay and other codes for high-SNR fnite-delay quantization of the Gaussian source at 1/2 Bit per sample", IEEE Transactions on Communications, vol. 38, No. 12 Dec. 1, 1990, pp. 2089-2093, XP000203339, ISSN: 0090-6678, DOI: 10.1109/26.64647.

Notification of Transmittal of the International Search Report and the Written Opinion of the International Searching Authority, or the Declaration, dated Feb. 15, 2017, 10 pages.

Notification of Transmittal of the International Search Report and the Written Opinion of the International Searching Authority, or the Declaration., for PCT/US17/14997, dated Apr. 7, 2017.

Holden, B., "Simulation results for NRZ, ENRZ & PAM-4 on 16-wire full-sized 400GE backplanes", IEEE 802.3 400GE Study Group, Sep. 2, 2013, 19 pages, www.ieee802.0rg/3/400GSG/publiv/13_09/holden_400_01_0913.pdf.

Holden, B., "An exploration of the technical feasibility of the major technology options for 400GE backplanes", IEEE 802.3 400GE Study Group, Jul. 16, 2013, 18 pages, http://ieee802.org/3/400GSG/public/13_07/holden_400_01_0713.pdf.

Holden, B., "Using Ensemble NRZ Coding for 400GE Electrical Interfaces", IEEE 802.3 400GE Study Group, May 17, 2013, 24 pages, http://www.ieee802.org/3/400GSG/public/13_05/holden_400_01_0513.pdf.

Farzan, et al., "Coding Schemes for Chip-to-Chip Interconnect Applications", IEEE Transactions on Very Large Scale Integration (VLSI) Systems, vol. 14, pp. 393-406, Apr. 2006.

Anonymous, "Constant-weight code", Wikipedia.org, retrieved on Jun. 2, 2017.

Reza Navid et al, "A 40 Gb/s Serial Link Transceiver in 28 nm CMOS Technology", IEEE Journal of Solid-State Circuits, vol. 50, No. 4. Apr. 2015, pp. 814-827.

Linten, D. et al, "T-Diodes—A Novel Plus-and-Play Wideband RF Circuit ESD Protection Methodology" EOS/ESD Symposium 07, pp. 242-249.

(56) References Cited

OTHER PUBLICATIONS

Hyosup Won et al, "A 28-Gb/s Receiver With Self-contained Adaptive Equalization and Sampling Point Control Using Stochastic Sigma-Tracking Eye-Opening Monitor", IEEE Transactions on Circuits and Systems—I: Regular Papers, vol. 64, No. 3, Mar. 2017. pp. 664-674.

Giovaneli, et al., "Space-frequency coded OFDM system for multi-wire power line communications", Power Line Communications and Its Applications, 20015 International Symposium on Vancouver, BC, Canada, Apr. 6-8, 2005, Piscataway, NJ, pp. 191-195.

Shibasaki, et al., "A 56-Gb/s Receiver Front-End with a CTLE and 1-Tap DFE in 20-nm CMOS", IEEE 2014 Symposium on VLSI Circuits Digest of Technical Papers, 2 pgs.

Hidaka, et al., "A 4-Channel 1.25-10.3 Gb/s Backplane Transceiver Macro With35 dB Equalizer and Sign-Based Zero-Forcing Adaptive Control", IEEE Journal of Solid-State Circuits, vol. 44 No. 12, Dec. 2009, pp. 3547-3559.

\* cited by examiner

MULTIPHASE DATA RECEIVER WITH DISTRIBUTED DFE

CROSS-REFERENCE TO RELATED APPLICATIONS

This application claims the benefit of U.S. Provisional Application No. 62/411,937, entitled "Multiphase Data Receiver with Distributed DFE," filed Oct. 24, 2016, which is hereby incorporated herein by reference.

REFERENCES

The following prior applications are herein incorporated by reference in their entirety for all purposes:

U.S. Patent Publication 2011/0268225 of application Ser. No. 12/784,414, filed May 20, 2010, naming Harm Cronie and Amin Shokrollahi, entitled "Orthogonal Differential Vector Signaling" (hereinafter "Cronie I").

U.S. Patent Publication 2011/0302478 of application Ser. No. 12/982,777, filed Dec. 30, 2010, naming Harm Cronie and Amin Shokrollahi, entitled "Power and Pin Efficient Chip-to-Chip Communications with Common-Mode Resilience and SSO Resilience" (hereinafter "Cronie II").

U.S. patent application Ser. No. 13/542,599, filed Jul. 5, 2012, naming Armin Tajalli, Harm Cronie, and Amin Shokrollahi, entitled "Methods and Circuits for Efficient Processing and Detection of Balanced Codes" (hereafter called "Tajalli I".)

U.S. patent application Ser. No. 13/842,740, filed Mar. 15, 2013, naming Brian Holden, Amin Shokrollahi and Anant Singh, entitled "Methods and Systems for Skew Tolerance in and Advanced Detectors for Vector Signaling Codes for Chip-to-Chip Communication", hereinafter identified as [Holden I];

U.S. Provisional Patent Application No. 61/946,574, filed Feb. 28, 2014, naming Amin Shokrollahi, Brian Holden, and Richard Simpson, entitled "Clock Embedded Vector Signaling Codes", hereinafter identified as [Shokrollahi I].

U.S. patent application Ser. No. 14/612,241, filed Aug. 4, 2015, naming Amin Shokrollahi, Ali Hormati, and Roger Ulrich, entitled "Method and Apparatus for Low Power Chip-to-Chip Communications with Constrained ISI Ratio", hereinafter identified as [Shokrollahi II].

U.S. patent application Ser. No. 13/895,206, filed May 15, 2013, naming Roger Ulrich and Peter Hunt, entitled "Circuits for Efficient Detection of Vector Signaling Codes for Chip-to-Chip Communications using Sums of Differences", hereinafter identified as [Ulrich I].

U.S. patent application Ser. No. 14/816,896, filed Aug. 3, 2015, naming Brian Holden and Amin Shokrollahi, entitled "Orthogonal Differential Vector Signaling Codes with Embedded Clock", hereinafter identified as [Holden II].

U.S. patent application Ser. No. 14/926,958, filed Oct. 29, 2015, naming Richard Simpson, Andrew Stewart, and Ali Hormati, entitled "Clock Data Alignment System for Vector Signaling Code Communications Link", hereinafter identified as [Stewart I].

U.S. patent application Ser. No. 14/925,686, filed Oct. 28, 2015, naming Armin Tajalli, entitled "Advanced Phase Interpolator", hereinafter identified as [Tajalli II].

U.S. Provisional Patent Application No. 62/286,717, filed Jan. 25, 2016, naming Armin Tajalli, entitled "Voltage Sampler Driver with Enhanced High-Frequency Gain", hereinafter identified as [Tajalli III].

U.S. Provisional Patent Application No. 62/326,593, filed Apr. 22, 2016, naming Armin Tajalli, entitled "Sampler with Increased Wideband Gain and Extended Evaluation Time", hereinafter identified as [Tajalli IV].

U.S. Provisional Patent Application No. 62/326,591, filed Apr. 22, 2016, naming Armin Tajalli, entitled "High Performance Phase Locked Loop", hereinafter identified as [Tajalli V].

U.S. Provisional Patent Application No. 62/326,593, filed Apr. 22, 2016, naming Armin Tajalli and Ali Hormati, entitled "Sampler with Increased Wideband Gain and Extended Evaluation Time", hereinafter identified as [Tajalli VI].

FIELD OF THE INVENTION

The present embodiments relate to communications systems circuits generally, and more particularly to calculating and applying inter-symbol interference corrective factors at a data receiver, as one component of detecting received communications signals from a high-speed multi-wire interface used for chip-to-chip communication.

BACKGROUND

In modern digital systems, digital information has to be processed in a reliable and efficient way. In this context, digital information is to be understood as information available in discrete, i.e., discontinuous values. Bits, collection of bits, but also numbers from a finite set can be used to represent digital information.

In most chip-to-chip, or device-to-device communication systems, communication takes place over a plurality of wires to increase the aggregate bandwidth. A single or pair of these wires may be referred to as a channel or link and multiple channels create a communication bus between the electronic components. At the physical circuitry level, in chip-to-chip communication systems, buses are typically made of electrical conductors in the package between chips and motherboards, on printed circuit boards ("PCBs") boards or in cables and connectors between PCBs. In high frequency applications, microstrip or stripline PCB traces may be used.

Common methods for transmitting signals over bus wires include single-ended and differential signaling methods. In applications requiring high speed communications, those methods can be further optimized in terms of power consumption and pin-efficiency, especially in high-speed communications. More recently, vector signaling methods have been proposed such as described in [Cronie I] and [Cronie II] to further optimize the trade-offs between power consumption, pin efficiency and noise robustness of chip-to-chip communication systems. In those vector signaling systems, digital information at the transmitter is transformed into a different representation space in the form of a vector codeword that is chosen in order to optimize the power consumption, pin-efficiency and speed trade-offs based on the transmission channel properties and communication system design constraints. Herein, this process is referred to as "encoding". The encoded codeword is communicated as a group of signals from the transmitter to one or more receivers. At a receiver, the received signals corresponding to the codeword are transformed back into the original digital information representation space. Herein, this process is referred to as "decoding".

Regardless of the encoding method used, the received signals presented to the receiving device must be sampled (or their signal value otherwise recorded) at intervals best representing the original transmitted values, regardless of transmission channel delays, interference, and noise. The timing of this sampling or slicing operation is controlled by an associated Clock and Data Recovery (CDR) timing system, which determines the appropriate sample timing. [Stewart I] and [Tajalli V] provide examples of such CDR systems.

BRIEF DESCRIPTION

Methods and systems are described for receiving an input data voltage signal at a first data decision circuit of set of pipelined data decision circuits, receiving an aggregate decision feedback equalization (DFE) correction current signal from a first analog current summation bus, the aggregate DFE correction current signal comprising at least one DFE tap-weighted current from at least one respective other data decision circuit of the set of pipelined data decision circuits, determining a data output decision value based on the received input data voltage signal and the received aggregate DFE correction current signal, and generating at least one outbound DFE tap-weighted current on at least one other analog current summation bus connected to at least one other data decision circuit of the set of pipelined data decision circuits.

Methods and systems are described for obtaining a sampled data bit, generating at least two DFE tap-weighted currents based on the sampled data bit and a set of at least two computed DFE factors, and responsively providing the at least two DFE tap-weighted currents to corresponding analog summation busses of a set N−1 analog summation busses connected to N−1 other data decision circuits, wherein N is an integer greater than 1, receiving, via a Nth analog summation bus, an aggregate DFE correction current signal representing a summation of at least two DFE tap-weighted currents generated by a corresponding at least two of the N−1 other data decision circuits, and forming a corrected input signal by applying the aggregate DFE correction current signal to an input signal received via a multi-wire bus.

Communications receivers must continue to operate reliably on received signals that may have undergone significant attenuation due to transmission line losses, as well as distortions caused by frequency-dependent attenuation and inter-symbol interference (ISI). Receive signal amplifiers and equalizers, such as the well-known Continuous Time Linear Equalizer (CTLE) can mitigate some of these degradations. [Tajalli III] provides examples of such embodiments, in which the high frequency gain of the sampling circuit may be advantageously boosted over a narrow frequency range, in a so-called high frequency peaking action. [Tajalli IV] describes other embodiments providing broadband gain.

Receive signal distortion caused by inter-symbol interference may be mitigated by use of Decision Feedback Equalization (DFE), where correction factors derived from previously-received symbols are used to correct distortions in the currently received symbol. However, at very high data rates generation of such DFE correction factors may be problematic, as previous symbol values may not have been fully determined in time to aid resolution of the next symbol value. Embodiments are described that efficiently generate DFE correction factors, and allow them to be applied to pipelined or parallel processed receiver instances.

DETAILED DESCRIPTION

Figure 1:
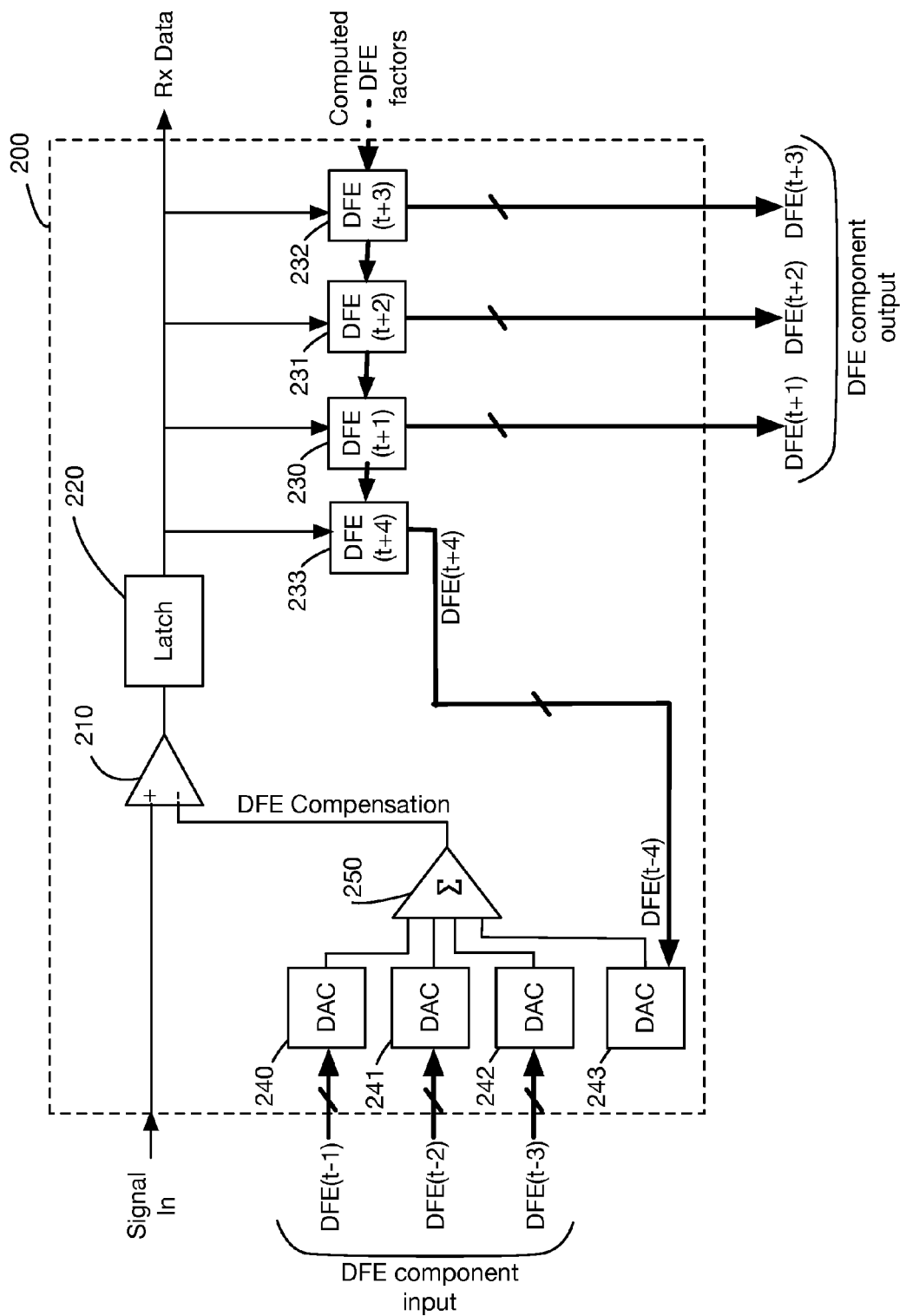
FIG. 1 shows a prior art embodiment of a conventional data detector with DFE

To reliably detect the data values transmitted over a communications system, a communications receiver must accurately measure its received signal value amplitudes at carefully selected times, typically at or near the center of that received signal's period of stability between transitions (i.e. once per receive unit interval, or UI.) This point is commonly described as the "center of eye", (referring to the "eye diagram" of signal amplitude vs. clock intervals) and is typically determined by use of a local "receive clock" which is configured to occur at that desirable sampling time. Generation and ongoing control of such receive clock timing is well understood in the art, as Clock Data Alignment (CDA, also known as Clock Data Recovery or CDR) systems measure and incrementally adjust sample timing versus receive signal stability time to optimize sample timing.

In some embodiments, the value of the received signal is first captured at the selected time using a sample-and-hold or track-and-hold circuit, and then the resulting value is measured against one or more reference values using a known voltage comparator circuit.

The source of the input signal to the embodiments described herein may be derived from a single wire signal, or may be derived from a weighted linear combination of multiple wire signals, such as provided by a Multi Input Comparator or mixer (MIC) used to detect vector signaling codes and described in [Tajalli I], [Holden I] and [Ulrich I.]

Multiphase Receive Processing

As communications system signaling rates have increased, it has become progressively more difficult to perform all elements of receive data processing during a single receive unit interval. Some embodiments have resorted to pipelining; utilizing clocked latches to separate sequential processing steps and allow them to be performed essentially in series over multiple unit intervals. However, as every element of the pipeline must operate at the same high clock speed as the input, pipelining alone cannot compensate for insufficient logic speed or mitigate excessive power consumption in the receiver system.

Other embodiments distribute received signals over multiple receive processing phases, each such phase performing the reception operations essentially in parallel with other phases, the resulting received data from the multiple phases then being consolidated for subsequent use or storage. In such an architecture, each processing phase may have more time to perform the computations, and optionally may be configured to operate at a lower clock rate than the original received signal source, thus relaxing logic speed concerns and/or permitting reduced power consumption.

As one illustrative example, a digital data stream transmitted at 32 Gbits/second may be processed by a fully serial receiver operating at a clock rate of 32 GHz and thus having a single 33 psec unit interval in which it must perform the detection operations for a single received bit. In an alternative multiphase receiver embodiment, signals from consecutive received unit intervals are distributed across, as an example, eight essentially identical processing phases, each such phase then having as much as 264 psec to perform the detection operations for a single received bit. In a further embodiment requiring only small amounts of processing within each phase (e.g. slicing of the resulting signal to obtain a digital bit value, and latching of that digital bit value to produce a data output), the processing phases may be operated at a reduced clock rate (e.g. 4 GHz versus 32 GHz,) substantially reducing power consumption.

Decision Feedback Equalization

Decision Feedback Equalization or DFE is a technique used to improve signal detection capabilities in serial communication systems. It presumes that the transmission line characteristics of the communications channel between transmitter and receiver are imperfect, thus energy associated with previously transmitted bits may remain in the channel (for example, as reflections from impedance perturbations) to negatively impact reception of subsequent bits. A receiver's DFE system processes each bit detected in a past unit interval (UI) through a simulation of the communications channel to produce an estimate of that bit's influence on a subsequent unit interval. That estimate, herein called the "DFE correction", may be subtracted from the received signal to compensate for the predicted inter-symbol interference. Alternative embodiments may perform the functionally equivalent operation of such subtraction, by measuring the received signal (e.g. using a differential comparator) at a reference voltage level derived from the DFE correction signal. Practical DFE systems apply DFE corrections derived from multiple previous unit intervals (herein individually described as "DFE factors") to the received signal before detecting a data bit.

At very high data rates, there may not be sufficient time to detect a received bit, calculate its associated DFE factors, and apply the resulting DFE correction to the next received unit interval in time to detect the next bit. Thus, some embodiments utilize so-called "unrolled DFE", where correction values are speculatively determined for some or all possible combinations of previous data values, those speculative corrections are applied to multiple copies of the received signal, and speculative detections made of the resulting corrected signal instances. When the earlier data values are finally resolved, the correct speculatively detected output may be chosen as the received data value for that unit interval.

"Unrolling" of DFE for even a modest number of historical unit intervals in this way uses a significant number of speculative results to be maintained effectively in parallel, introducing significant circuit complexity and associated power consumption.

Other embodiments as described in [Tajalli VI] utilize analog memory elements such as a sample-and-hold circuit, to retain a copy of the received signal in analog form until a DFE correction is available.

Complexity of Known Art Multiphase DFE

The functional steps performed by a known art DFE system typically comprise maintenance of a history of data values received in previous receive unit intervals, computation of an influence factor each such historical data value would have on a forthcoming receive unit interval, combination of these influence factors into a composite DFE correction, application of the DFE correction to the received signal, and ultimate detection of a data value from that corrected received signal.

Figure 2:
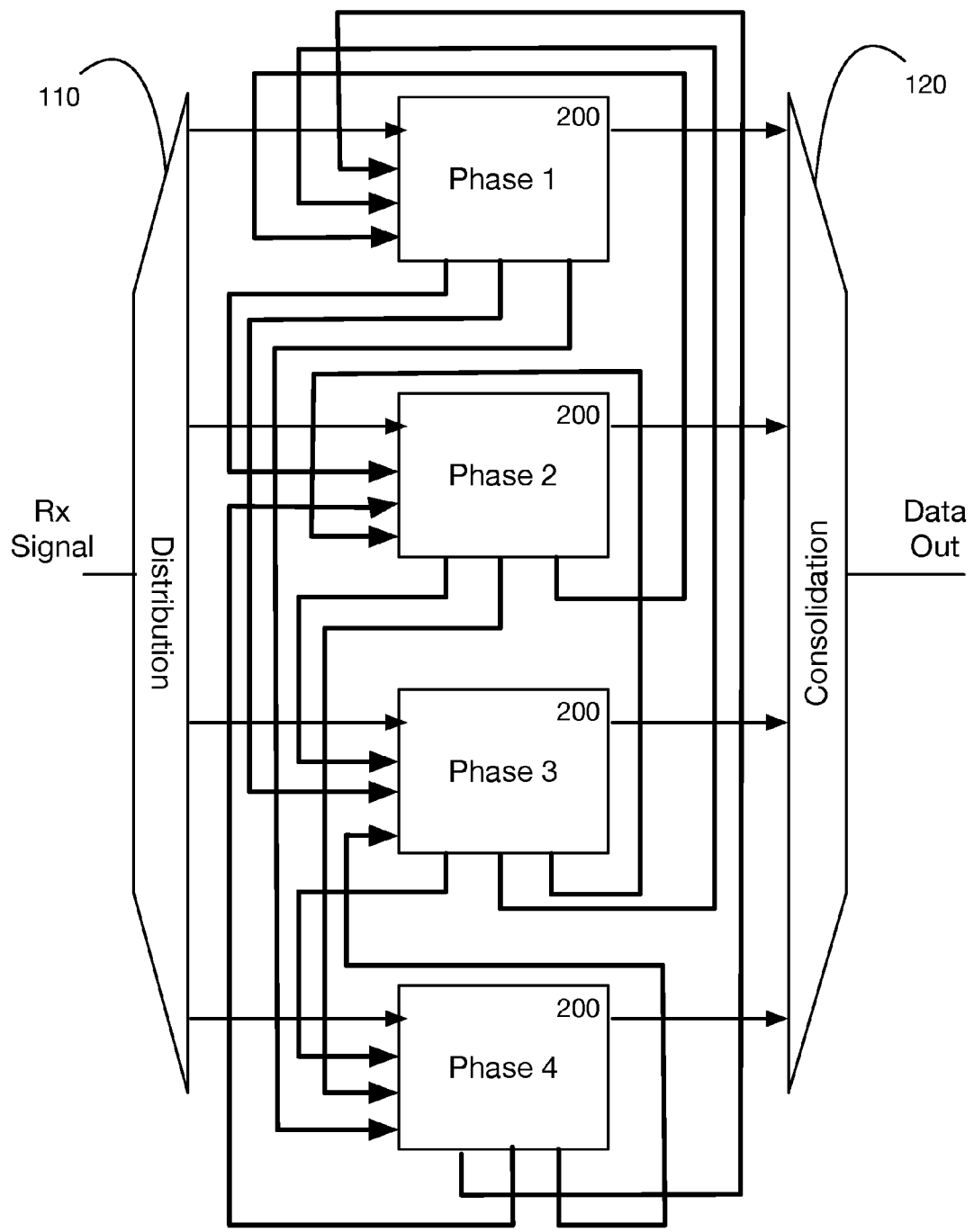
FIG. 2 shows a prior art system incorporating four instances of the data detector of FIG. 1 to receive consecutive unit intervals in a multi-phase receiver configuration.

One example of a known art receiver incorporating multiple processing phases is shown in FIG. 2. Received signals are Distributed 110 in consecutive unit intervals to each of the example four processing phases 200, each detecting one received data value, the detected data values then being Consolidated 120 to produce a complete or continuous Data Out result. Because detection of four unit intervals proceeds essentially in parallel within the four processing phases, communication of DFE information across the multiple processing phases is complex; for the illustrated example of four phase processing, the previous three received data values for any give detection are not available within the context of that detection's processing phase, but instead must be obtained from the other essentially parallel processing phases. More significantly, each processing phase has four unit interval clock cycles to perform its detection (as each of the four phases must start a new detection every fourth received unit interval,) but the penultimate detected data value is not available to it until the third of those clock cycles, when the processing phase operating on the previous receive unit interval's sample has completed. Thus, it is essential that the DFE correction be computed and made available very quickly.

A conventional DFE architecture based on the previously described known art functional steps typically incorporates point-to-point digital busses that interconnect the processing phases shown in FIG. 2, each phase 200 outputting a digital word representing a computation of an influence factor that phase's detected data value would have on another receive unit interval. The number of such digital interconnections scales with both the number of processing phases utilized, and with the depth of the DFE correction derived from data detected within those processing phases. If, as an example, each phase contributes one historical value to each other phase (i.e. the DFE is calculated across at least three previous unit intervals for the example four phases,) a total of twelve unidirectional digital busses are used or at least 96 wires (plus any bus handshake or strobe signals), assuming the digital words on each bus are 8 bits wide.

FIG. 1 shows one example of a known art detector as used in such a system, with the received Signal In corrected by subtraction of a DFE Compensation value and then sampled by Sampler 210, with the resulting digital value then recorded by Latch 220 and output as Rx Data. Presuming that the DFE system computes how this received data bit might interact with the subsequent three unit intervals, FIG. 1 shows Rx Data being input to DFE factor generators 230, 231, and 232, producing three DFE factors relevant to the next three unit intervals, i.e. to the (now+1), (now+2), and (now+3) unit intervals; relative to the other processing phases detecting those unit intervals and utilizing those factors, the same DFE factors would be relatively described as coming from the (now−1), (now−2), and (now−3) historical unit intervals. In some embodiments, a given circuit may retain its own data decision for use as a decision generated in a 4th historical unit interval, as shown by DFE factor generator 233 feeding back to DAC 243.

Each DFE factor generator 230, 231, 232, 233 multiplies the detected data value by the predetermined scaling factor appropriate to that component of the DFE correction. As known in the art, said predetermined scaling factors may be pre-calculated, configured, determined heuristically, or computed based on measurements of the received signal characteristics; for illustrative purposes they are shown in FIG. 1 as being input e.g. by configuration, without implying limitation. In embodiments in which the detected data value is binary, the DFE factor generators may simply select between two values derived from the scaling factor, based on the digital value of the received data.

Similarly, the DFE Compensation applied to the current unit interval is composed of components corresponding to the previous three unit intervals. Each data bus terminates in a digital to analog converter circuit 240, 241, 242, 243 that receives each of the digital words and produces an analog result. The various analog values representing the DFE factors are then summed 250 to produce the final DFE correction to the sampled input signal from which the data result will be detected. (Alternatively, in other embodiments the components may be summed in the digital domain, and the result converted to analog.) Regardless, each processing phase 200 must provide three DFE factor generators to send partial DFE compensation values representing (now+1), (now+2), and (now+3) compensation terms to the other three phases, as well as an adder and at least one DAC to generate its own DFE compensation value from the DFE factors provided to it by other phases.

Alternative Embodiment

Figure 3:
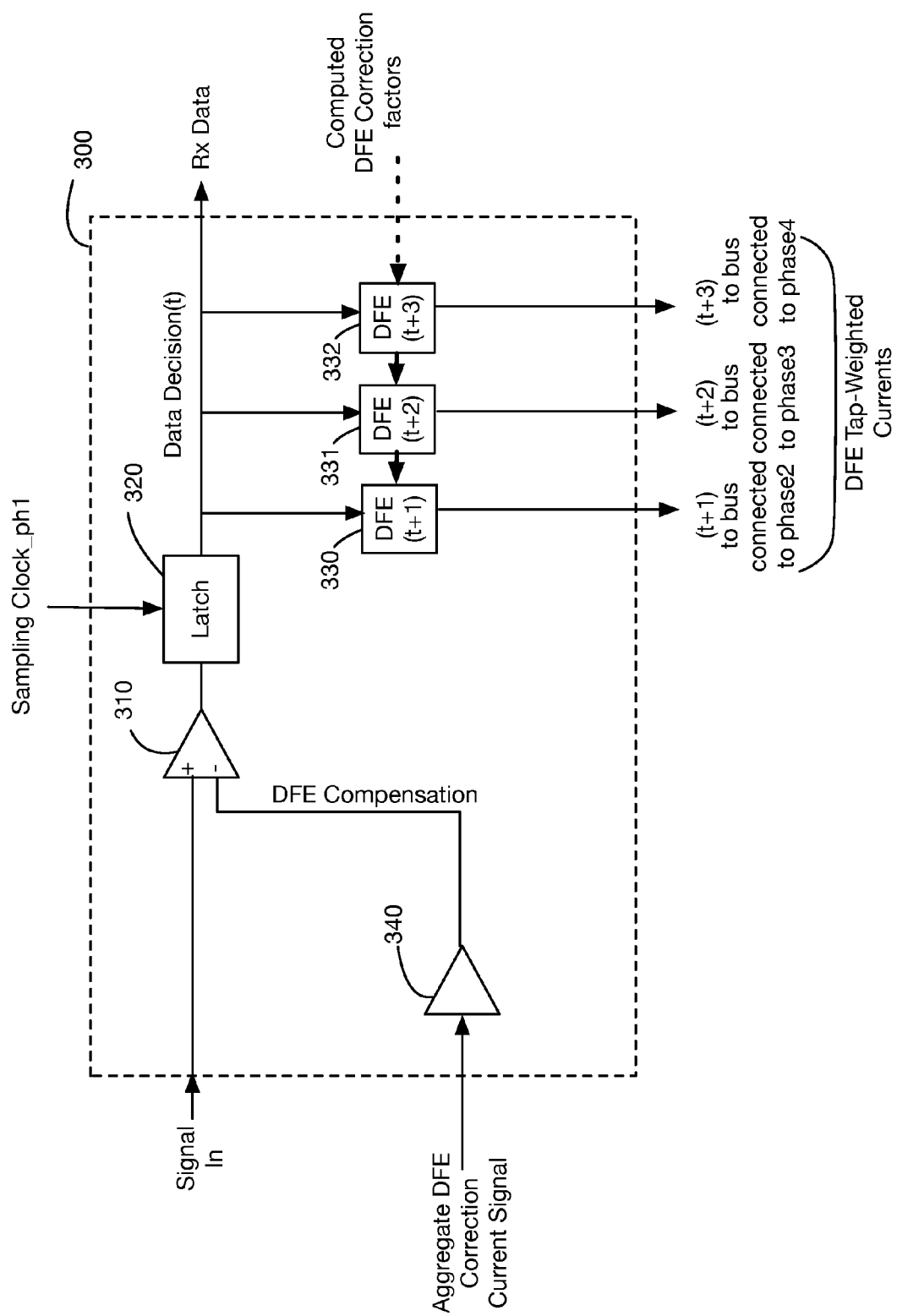
FIG. 3 illustrates one embodiment of a data detector with DFE compensation distributed using an analog bus.
Figure 4:
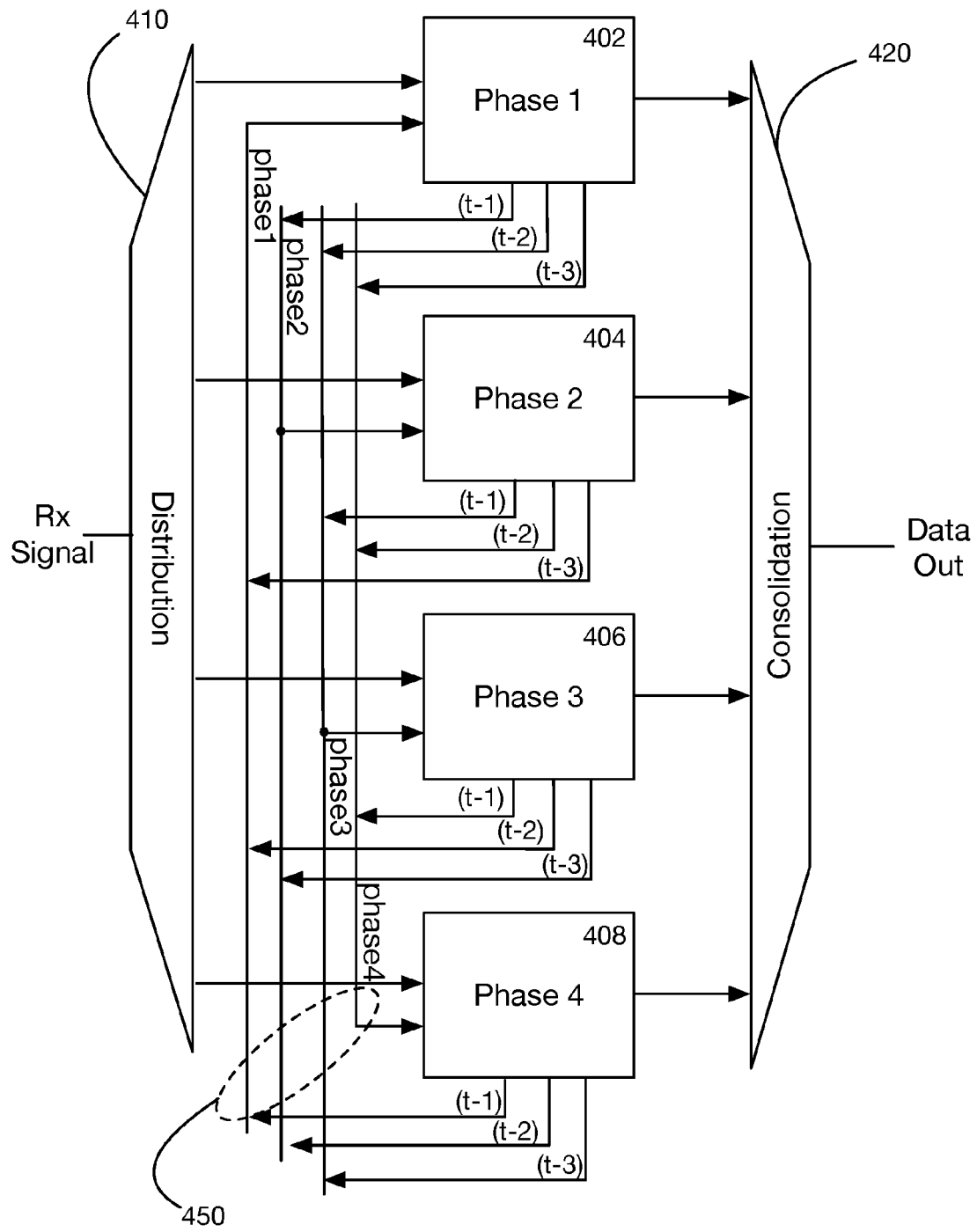
FIG. 4 shows a system embodiment incorporating four instances of the data detector of FIG. 3 to receive consecutive unit intervals in a multi-phase receiver configuration.

An alternative embodiment of a receiver utilizing Decision Feedback Compensation and configured to operate as multiple essentially parallel processing phases is illustrated in FIG. 3. For the purposes of description below, a set of pipelined data decision circuits may operate on a plurality of phases of a sampling clock, and may be interconnected by a distributed analog current summation bus. Throughout this description, each data decision circuit may simply be referred to as a "phase" or a "processing phase" as shown in FIG. 4 to identify which phase of the sampling clock the data decision circuit is operating on. In FIG. 4, there are four phases of data decision circuits 300, each operating on a respective phase of the sampling clock. In some embodiments, there may be four phases of the sampling clock 1-4, which may correspond to phases of 0, 90, 180, and 270 degrees, respectively. However, in some embodiments, fewer or additional phases may be used, and the above example should not be considered limiting. For the purposes of the following description, embodiments including four phases of data decision circuits are described, each operating on a corresponding phase 1-4 of the sampling clock. A data output decision value may be determined by e.g., latching 320 the output of slicer 310. Unlike the previously described known art DFE architecture, in this embodiment each data decision circuit incorporates digital-to-analog converters 330, 331, 332 configured to receive the data output decision value and to output one or more DFE tap-weighted currents for the (t+1), (t+2), and (t+3) future unit intervals. The DFE tap-weighted currents may be provided as analog currents to corresponding analog current summation busses interconnecting the set of pipelined data decision circuits operating on data received in the (t+1), (t+2), and (t+3) future unit intervals. If it is assumed that the data decision circuit is operating on phase 1 of the sampling clock (sampling clock_ph1), then the DFE tap-weighted current associated with the t+1 future unit interval is generated on the analog current summation bus providing an aggregate DFE correction current signal to the data decision circuit operating on phase 2 of the sampling clock. Similarly, the DFE tap-weighted currents for the t+2 and t+3 future unit intervals are generated on the busses providing aggregate DFE correction current signals to the data decision circuits operating on phases 3 and 4, respectively. Such a configuration is shown in FIG. 4 and explained in more detail below.

In at least one embodiment, a distributed analog current summation occurs as two or more data decision circuits each inject respective DFE tap-weighted currents representing the computed DFE correction components into an analog current summation bus. The data decision circuit acting as the analog current summation bus receiver receives an aggregate analog DFE correction current signal via current buffer 340, the aggregate DFE correction current signal representing a linear sum of the DFE tap-weighted currents (i.e. a sum of multiple terms contributed by different data decision circuits) which may be applied 310 directly to the received input data signal. In FIG. 3, the outbound DFE tap-weighted currents generated by the decision circuit are shown for being used in future unit intervals via the notation e.g. "t+1", however FIG. 4 uses the notation e.g., "t−1" to illustrate the DFE tap-weighted currents provided to each analog current summation bus are previously-generated DFE correction components with respect to the data decision circuit acting as the receiver of the aggregate DFE correction current signal. Furthermore, it should be noted that similar to FIG. 1, the data decision circuit 300 in FIG. 3 may feedback a "t−4" DFE tap-weighted current to the analog current summation bus providing the aggregate DFE correction current signal to the data decision circuit 300.

FIG. 4, includes four data decision circuits 402, 404, 406, and 408, each data decision operating on a respective phase of the sampling clock phase 1-4. The distributed analog current summation bus includes four analog current summation busses 450, labeled phase1, phase2, phase3, phase4 corresponding to the phase 1-4 of the sampling clock provided to the respective data decision circuit accepting each aggregate DFE correction current signal. Using analog current summation bus phase1 as an example, it may be seen that data decision circuit 402 operating on phase 1 of the sampling clock receives an aggregate DFE correction current signal including DFE tap-weighted current (t−1) from the data decision circuit 408 operating on phase 4 of the sampling clock, DFE tap-weighted current (t−2) from the data decision circuit 406 operating on phase 3 of the sampling clock, and DFE tap-weighted current (t−3) from the data decision circuit 404 operating on phase 2 of the sampling clock, the summation of which is accepted as the aggregate DFE correction current signal to apply to the received input data signal received at time t at data decision circuit operating on phase 1 of the sampling clock. The DFE tap-weighted currents described above are identified relative to the unit interval 't' being detected by the accepting data decision circuit.

In a further embodiment, a two-wire differential bus is used for each analog current summation bus, with each DFE tap-weighted current represented as the difference of currents injected into the two wires. In at least one such embodiment, the magnitude of the DFE tap-weighted currents injected into the bus by a single node represents the computed DFE correction factor, with the order in which those currents are injected (e.g. a first current to the first wire of the bus and a second current to the second wire of the bus, or the second current to the first wire and the first current to the second wire) determined by a historical data decision detected by that data decision circuit. In a further embodiment, the first and second currents are selected from predetermined values based on a digital value of the historical data output decision value. In a further embodiment, transistors acting as analog switches steer currents as directed by the historical data output decision value. In some embodiments, the magnitude of each DFE tap-weighted current is dependent on the difference in unit intervals between the other data decision circuits. For example, referring to the example of FIG. 3, the magnitude of the DFE tap-weighted current provided to the data decision circuit operating on phase 2 of the sampling clock to generate a data output decision value in unit interval t+1 would be larger than the magnitude of the DFE tap-weighted current provided to the data decision circuit operating on phase 3 of the sampling clock to generate a data output decision value in unit interval t+2.

Figure 5A:
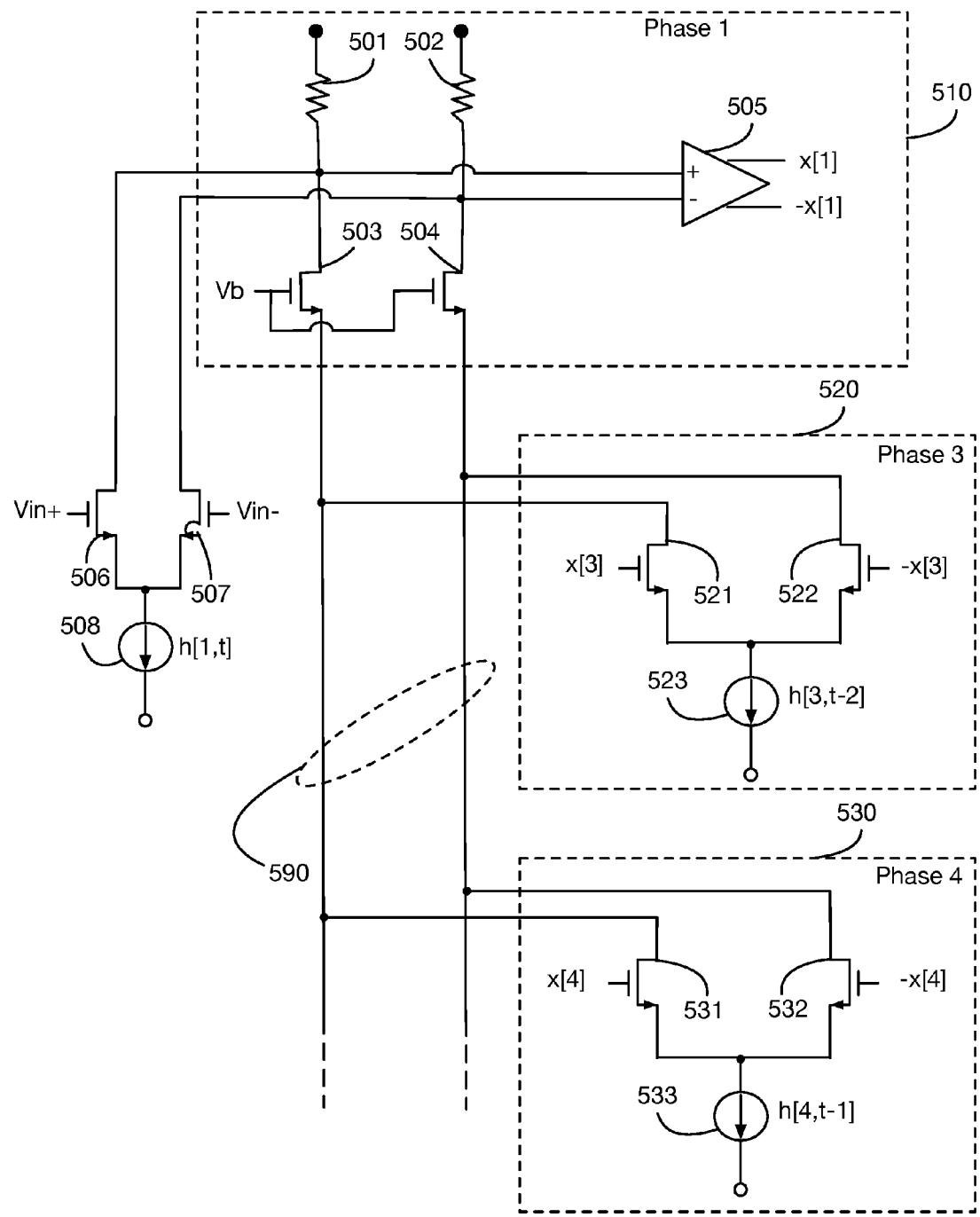
FIGS. 5A-5C is a schematic of one embodiment in which a differential analog bus is used to sum DFE factors and produces a DFE correction.
Figure 5B:
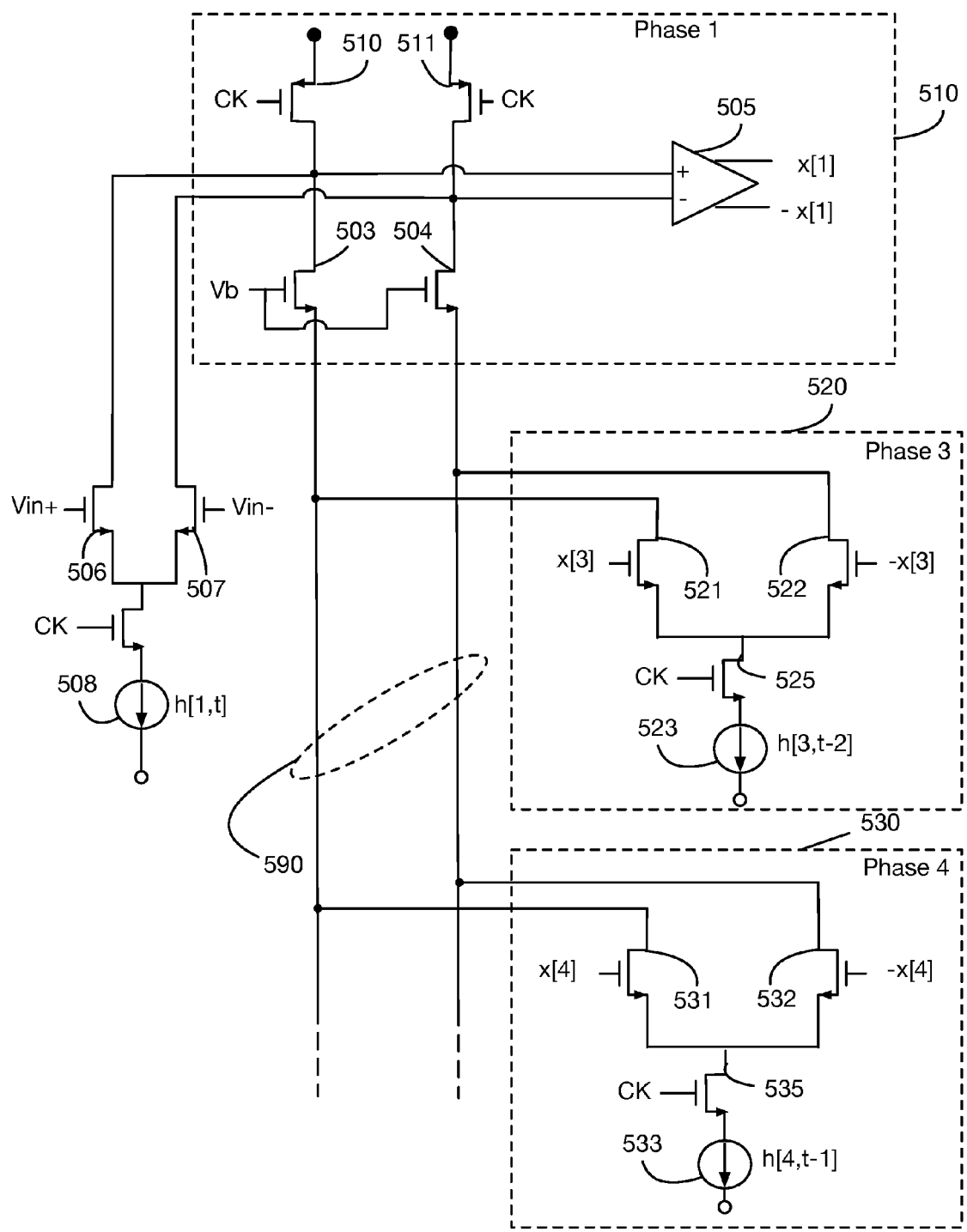
Figure 5C:
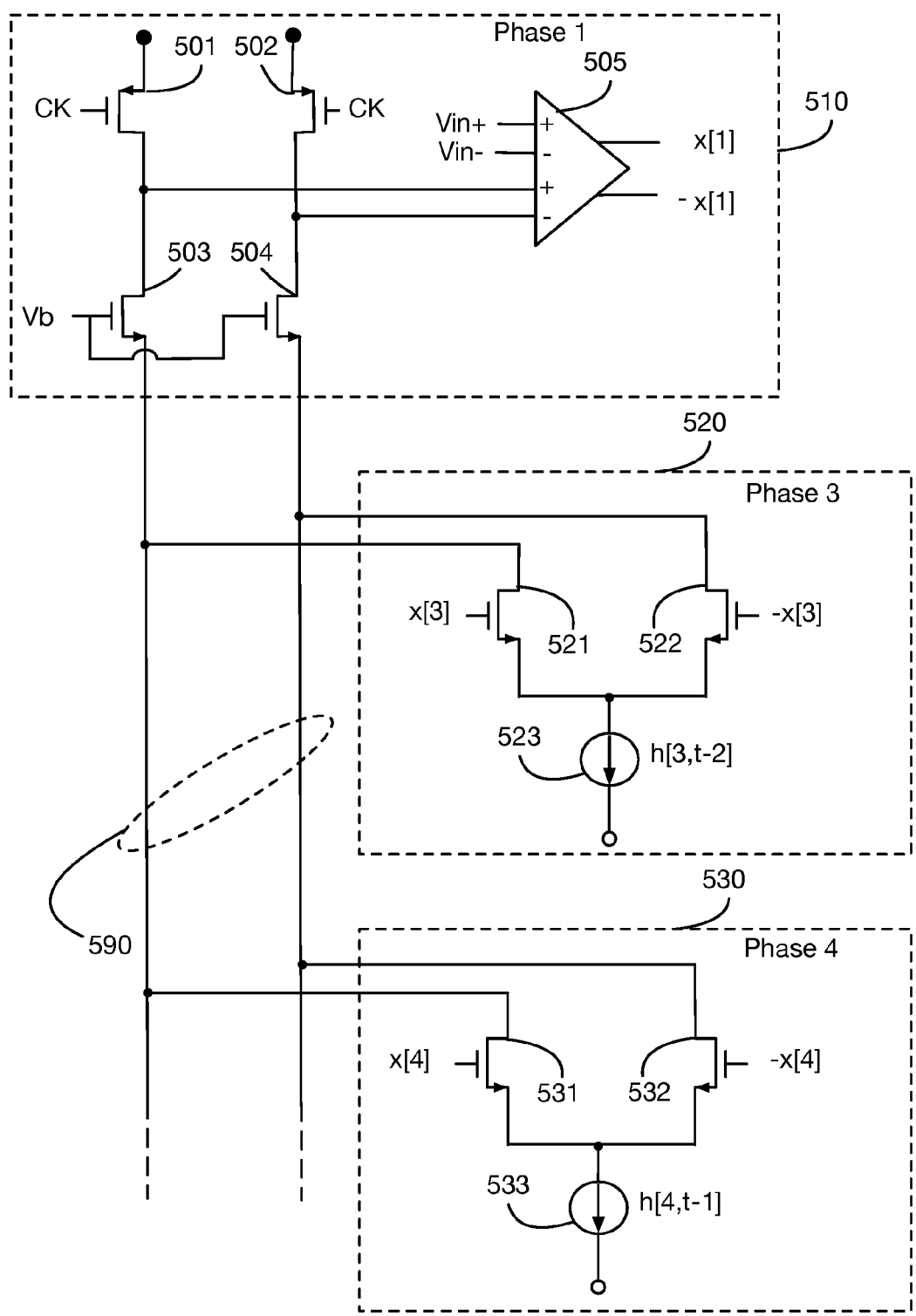
Figure 6:
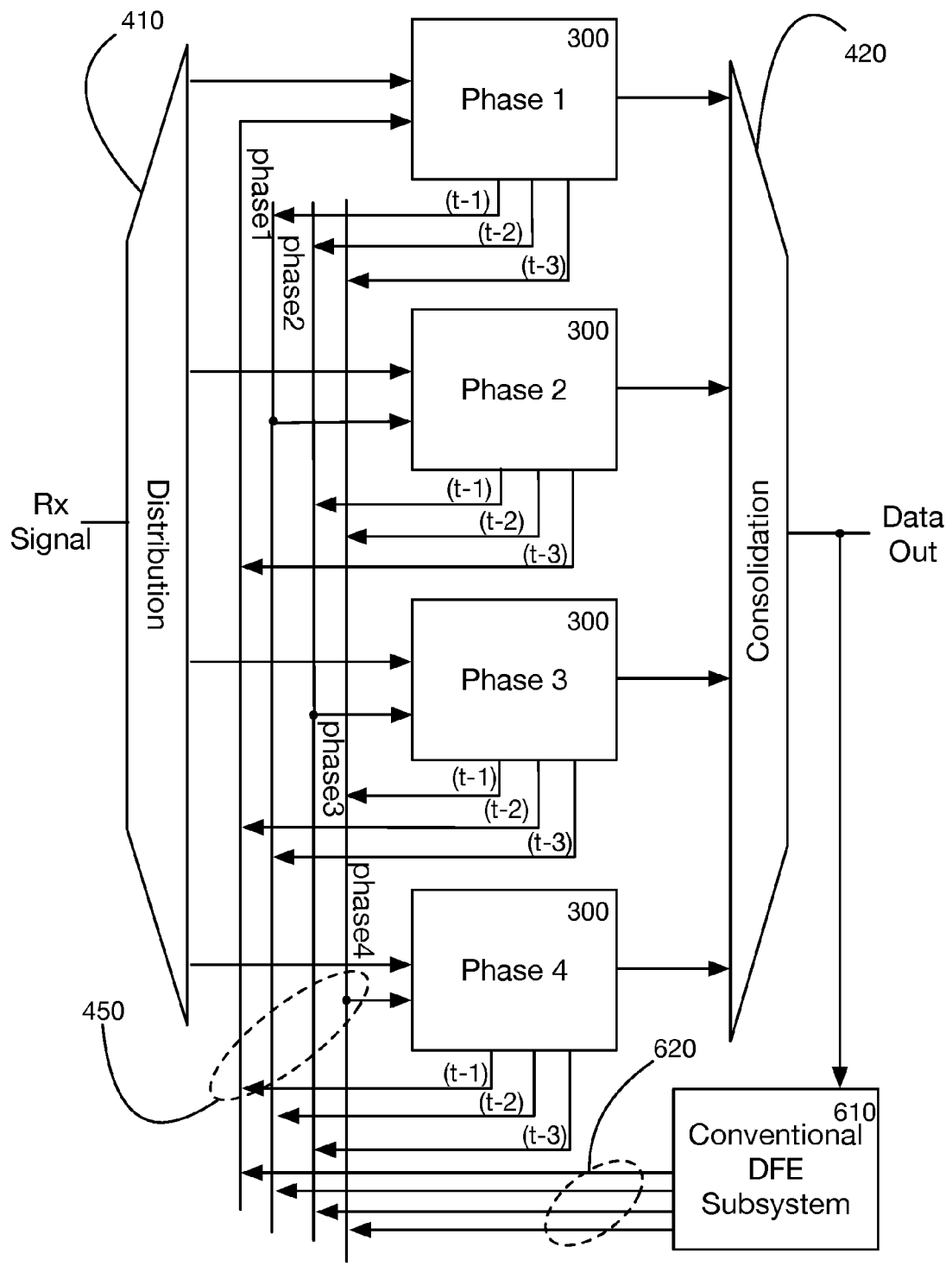
FIG. 6 illustrates a further embodiment, in which the system of FIG. 4 additionally computes DFE correction terms associated with earlier unit intervals.

A further embodiment is shown in FIG. 6, suitable for environments in which deeper DFE compensation is performed. One such embodiment may perform DFE compensation for propagation anomalies further back in time than (#phases−1)*(unit interval duration). Added to the system of FIG. 4, an additional DFE subsystem 610 utilizing known art methods maintains a record of historical data from the Data Out stream, and computes further DFE corrections based on that historical data. These further DFE tap-weighted currents 620 may then be injected into one or more analog current summation busses 450 in a similar manner to the DFE tap-weighted currents generated by 330, 331, 332 in FIG. 3, and in a similar manner as shown in FIGS. 5A-5C with respect to DFE correction circuits 520 and 530, which are described in more detail below. In some embodiments, the DFE subsystem 610 includes a data decision history element, e.g., a register, maintaining storage of data decisions past the 3 historical unit intervals shown in FIG. 6. In some embodiments, as many as 6 additional DFE tap-weighted currents going as far back as t−9 or t−10 unit intervals may be injected, however this number should not be considered as limiting.

Compared to the more than 96 digital interconnection wires needed in the previous example of FIG. 2, the comparable alternative embodiment of four phases and three DFE terms shown in FIG. 4 uses merely eight analog wires (four differential pairs) for interconnection, and each data decision circuit includes significantly less circuitry to output onto an analog current summation bus and to receive from an analog current summation bus, resulting in significant reductions in circuit size and power consumption. Such an alternative embodiment not only utilizes fewer wires per interconnection, but the number of interconnections scales only with the number of phases of the sampling clock, rather than number of phases and number of historical intervals t−1, t−2, etc. Further, in the circuits of FIGS. 1 and 2, the exchange of multi-bit digital DFE correction values is much slower as compared to the analog transportation described in the embodiments of FIGS. 3-6. This is due to the amount of time it takes to change wires from one state to another (i.e., from one voltage to another), which may be further slowed due to capacitive and/or inductive crosstalk, for example. The analog summation busses generate currents that have a much faster travel time and are thus more reliable in distributing the analog DFE correction components among the various phases of the processing circuit.

FIGS. 5A-5C show schematic diagrams illustrating embodiments incorporating multiple data decision circuits, where example data decision circuits operating on phases 3 and 4 of the sampling clock (which may correspond to phases 3 and 4 shown in FIG. 4) generate DFE tap-weighted currents on differential analog current summation bus 590, and the data decision circuit operating on phase 1 applies the aggregate DFE correction current signal produced by the summation on differential analog current summation bus 590 to a received input data signal, shown as Vin±. FIG. 5A includes analog DFE correction circuits 520 and 530, which may each correspond to a single instance of the analog DFE correction circuits 330, 331, 332 shown in FIG. 3. For the purposes of the following description, each analog DFE correction circuit may be referred to by the data decision circuit in which the analog DFE correction circuit is present. For example, analog DFE correction circuit 520 is present in data decision circuit operating on phase 3 of the sampling clock, while analog DFE correction circuit 530 is present in data decision circuit operating on phase 4 of the sampling clock. For the purposes of the following example, the received input data signal is received at time t, and the DFE tap-weighted currents generated by data decision circuits 530 and 520 are distributed according to data output decision values x[4] and x[3] generated at times t−1 and t−2, respectively. Thus the notation h[3, t−2] of current source 523 corresponds to the DFE correction component generated by data decision circuit operating on phase 3 of the sampling clock having a magnitude corresponding to the t−2 previous unit interval. No limitation is implied in either number or combination of phases.

As shown in FIG. 5A, data decision circuit 520 operating on phase 3 determined a historical data output decision value x[3] during unit interval t−2 that controls steering transistors 521 and 522 to proportionally direct portions of the total current h[3,t−2] set by DFE correction current source 523 into the two wires of differential analog current summation bus 590. In a practical embodiment, the magnitude h[3,t−2] of the DFE tap-weighted current represents the computed DFE correction factor, i.e. the influence of the historical data output decision value detected in the t−2 interval with respect to the data value to be detected in the t unit interval. The historical data output decision value x[3] determines a sign of the DFE tap-weighted current. In some embodiments, each data decision circuit may have different current source values h for each historical interval. Data decision circuit 530 performs a similar function, with current steering controlled by the steering transistors 531 and 532 operating on the historical data output decision value x[4] determined in the t−1 (immediately preceding) unit interval, and directs the DFE tap-weighted current having magnitude h[4,t−1] from current source 533 through the analog current summation bus. Other embodiments may incorporate different numbers of phases of data decision circuits providing DFE tap-weighted currents to analog current summation bus 590, using at least one such data decision circuit, and embodiments generally utilizing two or more such data decision circuits. For example, data decision circuit operating on phase 2 of the sampling clock is not shown in FIG. 5A, but it is evident that the data decision circuit operating on phase 2 may be included in a similar fashion as data decision circuits 520 and 530 in a configuration as illustrated in FIG. 4, providing a DFE tap-weighted current according to a data output decision value x[2] made and a computed DFE correction factor h[2,t−3] for the t−3rd unit interval.

Data decision circuit 510 of the set of pipelined data decision circuits applies the aggregate DFE correction current signal produced by the summing action of DFE tap-weighted currents on analog current summation bus 590 to the received input data signal. As shown in FIG. 5A, the received input data signal is applied to an input pair of transistors 506, 507. As shown, the combination of the aggregate DFE correction current signal and the current h[1,t] drawn through resistors 501 and 502 will generate a differential output voltage. The differential output voltage is provided to differential receiver 505 (which in practice may be part of a data sampler, integrator, or MIC) to generate a data output decision value x[1]. Data output decision value may subsequently be applied to steering transistors (not shown) for generating at least one DFE tap-weighted current on at least one other analog current summation bus.

FIGS. 5A-5C include a current buffer taking the form of buffering transistors 503 and 504. As shown, buffering transistors 503 and 504 receive a buffering voltage Vb, and act as a current buffer. The current buffer assists in maintaining a high-speed analog current summation bus by providing a near-constant voltage at the drains of the steering transistors in each data decision circuit. Such a constant voltage at each drain allows constant DFE tap-weighted currents to be generated on the analog current summation bus. As the effective impedance of summation bus 590 is very low due to the current buffer, the voltage swing on the wires of the bus will be limited. Hence, loss due to parasitic capacitance of the lines is minimized.

As shown in FIG. 5A, the differential input transistors 506 and 507 are connected to the drains of the current buffer transistors 503 and 504. Such embodiments may isolate the input transistors 506 and 507 from the capacitance of the analog current summation bus. It should be noted that in alternative embodiments (not shown), the differential input transistors 506 and 507 may be connected to the source of current buffer transistors 503 and 504 in a similar fashion as the steering transistors in data decision circuits 520 and 530. No limitation is implied.

In some embodiments, as shown in FIG. 5B, resistors 501 and 502 may be replaced by a differential pair of transistors 510/511 configured to receive a clock signal CK as an input. In this particular example, clock signal CK may correspond to phase 1 of the sampling clock. While CK is low, the differential output node connected to differential receiver 505 may be pre-charged via PMOS transistors 510/511, and the differential output node may begin discharging when CK goes high by enabling the DFE correction current sources 523 and 533 via NMOS transistors 525 and 535, respectively. Similarly, the current source 508 may be enabled by an NMOS transistor receiving CK as an input. In the embodiment of FIG. 5B, transistors 510, 511, 503, 504 provide an active load to bus 590, allowing differential receiver 505 to obtain the resulting DFE correction factor encoded as a difference of the sums of currents injected into the two wires of 590. FIG. 5C illustrates an alternative embodiment in which the input signal Vin± is provided directly to differential receiver 505.

Figure 7:
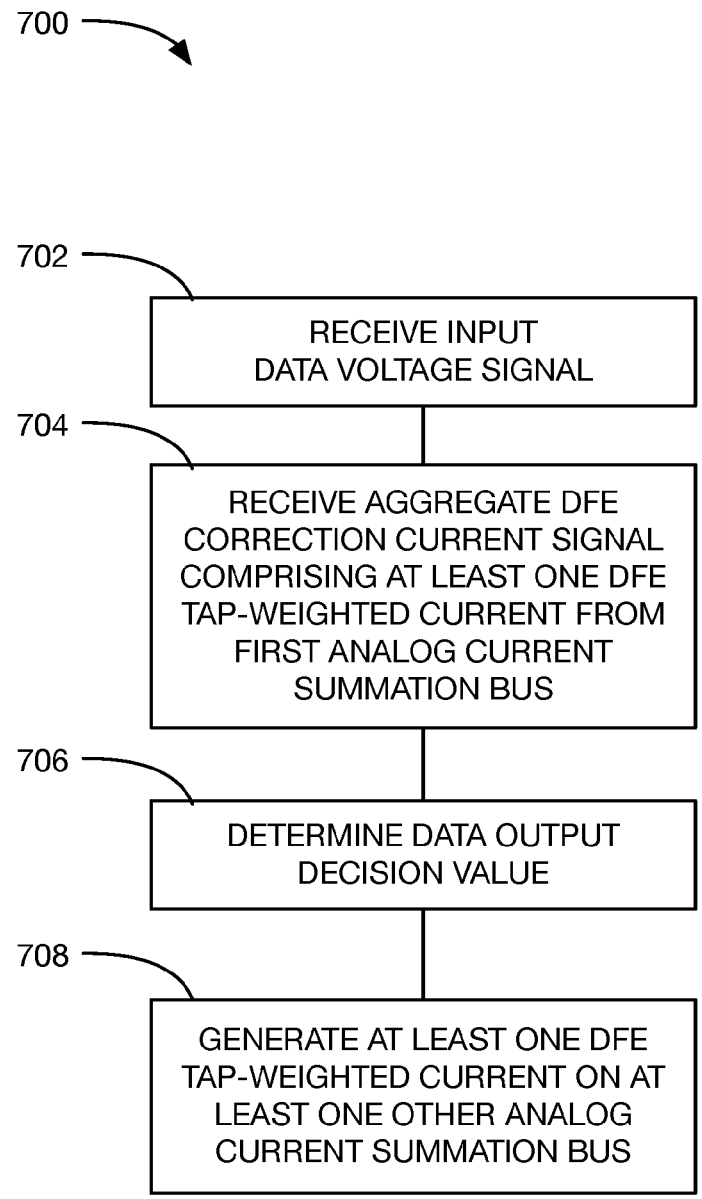
FIG. 7 illustrates a flowchart of a method, in accordance with some embodiments.

FIG. 7 depicts a flowchart of a method 700, in accordance with some embodiments. As shown, method 700 includes receiving, at step 702, an input data voltage signal at a first data decision circuit of set of pipelined data decision circuits. At step 704, an aggregate decision feedback equalization (DFE) correction current signal is received via a first analog current summation bus, the aggregate DFE correction current signal comprising at least one DFE tap-weighted current from at least one respective other data decision circuit of the set of pipelined data decision circuits. A data output decision value is determined at step 706 based on the received input data voltage signal and the received aggregate DFE correction current signal. At least one outbound DFE tap-weighted current is generated 708 on at least one other analog current summation bus connected to at least one other data decision circuit of the set of pipelined data decision circuits.

In some embodiments, the method further includes generating the plurality of DFE tap-weighted currents using a plurality of differential pairs of transistors connected in parallel to the first analog summation bus. In such embodiments, each DFE tap-weighted current has a corresponding magnitude h determined by a corresponding DFE correction factor current source connected to a respective differential pair of transistors. In some embodiments, each DFE tap-weighted current has a sign determined by a historical decision generated by an associated data decision circuit. In some embodiments, the plurality of DFE tap-weighted currents are drawn through a current buffer connected to the plurality of differential pairs of transistors.

In some embodiments, the aggregate DFE correction current signal further includes at least one DFE tap-weighted current provided by a data decision history element. In some embodiments, determining the data output decision value includes combining the received input data voltage with the aggregate DFE correction current signal. In some such embodiments, combining the received input data voltage with the aggregate DFE correction current signal includes generating a data current signal representative of the received input data voltage and performing an analog current summation of the aggregate DFE correction current signal and the data current signal. The data current signal may be generated by applying the input data voltage to a differential pair of transistors to draw the data current through a pair of resistors connected to the first analog current summation bus. In some embodiments, each data decision circuit of the set of pipelined data decision circuits operates on a respective phase of a plurality of phases of a sampling clock.

In some embodiments, a method includes obtaining a data output decision value, generating at least two DFE tap-weighted currents based on the sampled data bit and a set of at least two computed DFE factors. The at least two DFE tap-weighted currents are responsively provided to corresponding analog summation busses of a set N−1 analog summation busses connected to N−1 other data decision circuits, wherein N is an integer greater than 1. An aggregate DFE correction current signal is received via an Nth analog summation bus, the aggregate DFE correction current signal representing a summation of at least two DFE tap-weighted current generated by a corresponding at least two of the N−1 other processing phases. A corrected input signal is formed by applying the aggregate DFE correction current signal to an input signal received via a multi-wire bus.

In some embodiments, the method further includes slicing the corrected input signal, and responsively generating a data output decision value by latching the sliced corrected input signal. In some embodiments, the slicing is performed by an integrator. In alternative embodiments, the slicing is performed by a digital comparator.

In some embodiments, the corrected input signal is a voltage signal formed by subtracting the aggregate DFE correction current signal from the received input signal. In some embodiments, the voltage signal is formed by sinking the DFE tap-weighted currents through an active load connected to the received input signal. In some embodiments, the current sunk through the active load includes current associated with computed DFE factors of the at least two of the N−1 other data decision circuits. In some embodiments, the active load is a differential pair of transistors, and wherein generating the corrected input signal comprises controlling a voltage drop across the pair of transistors, each respective transistor having an associated voltage drop determined by a respective current sunk through the respective transistor.

In some embodiments, the at least two DFE tap-weighted currents comprise N−1 DFE tap-weighted currents, and wherein the DFE correction value represents a summation of N−1 DFE tap-weighted currents generated by the N−1 other processing phases. In some embodiments, each summation bus comprises a differential pair of wires.

The invention claimed is:

1. A method comprising:
receiving an input data voltage signal at a first data decision circuit of a set of pipelined data decision circuits operating in parallel in a respective set of signal processing phases, each data decision circuit of the set of pipelined data decision circuits operating on a respective phase of a plurality of phases of a sampling clock;
receiving an aggregate decision feedback equalization (DFE) correction current signal from a first analog current summation bus, the aggregate DFE correction current signal comprising at least one DFE tap-weighted current from at least one other respective data decision circuits of the set of pipelined data decision circuits;
determining a data output decision value based on the received input data voltage signal and the received aggregate DFE correction current signal; and,
generating at least one outbound DFE tap-weighted current on at least one other analog current summation bus connected to at least one other data decision circuit of the set of pipelined data decision circuits.

2. The method of claim 1, further comprising generating the at least one DFE tap-weighted current using at least one differential pair of transistors connected in parallel to the first analog summation bus.

3. The method of claim 2, wherein each DFE tap-weighted current has a corresponding magnitude determined by a corresponding DFE correction factor current source connected to a respective differential pair of transistors.

4. The method of claim 2, wherein each DFE tap-weighted current has a sign determined by a historical decision generated by an associated data decision circuit.

5. The method of claim 2, wherein the at least one DFE tap-weighted current is drawn through a current buffer connected to the at least one differential pair of transistors.

6. The method of claim 1, wherein the aggregate DFE correction current signal further comprises at least one DFE tap-weighted current provided by a data decision history element.

7. The method of claim 1, wherein determining the data output decision value comprises combining the received input data voltage with the aggregate DFE correction current signal.

8. The method of claim 7, wherein combining the received input data voltage with the aggregate DFE correction current signal comprises generating a data current signal representative of the received input data voltage and performing an analog current summation of the aggregate DFE correction current signal and the data current signal.

9. The method of claim 8, wherein generating the data current signal comprises applying the input data voltage to a differential pair of transistors to draw the data current through a pair of resistors connected to the first analog current summation bus.

10. An apparatus comprising:
a set of pipelined data decision circuits interconnected by a distributed analog current summation bus, the set of pipelined data decision circuits operating in parallel in a respective set of signal processing phases, each data decision circuit of the set of pipelined data decision circuits operating on a respective phase of a plurality of phases of a sampling clock, the set of pipelined data decision circuits comprising a first data decision circuit configured to:
receive (i) an input data voltage signal and (ii) an aggregate decision feedback equalization (DFE) correction current signal from a first analog current summation bus of the distributed analog current summation bus, the aggregate DFE correction current signal comprising at least one DFE tap-weighted current from respective other data decision circuits of the set of pipelined data decision circuits;
determine a data output decision value based on the received input data voltage signal and the received aggregate DFE correction current signal; and,
generate at least one DFE tap-weighted current on at least one other analog current summation bus connected to at least one other data decision circuit of the set of pipelined data decision circuits.

11. The apparatus of claim 10, wherein each of the respective other data decision circuits comprises a respective differential pair connected to the first analog current summation bus for generating a corresponding DFE tap-weighted current of the at least one DFE tap-weighted currents.

12. The apparatus of claim 11, wherein the respective differential pair is configured to receive a corresponding historical data decision generated by a corresponding other data decision circuit to apply a sign to the corresponding DFE tap-weighted current.

13. The apparatus of claim 11, wherein the respective differential pair is connected to a DFE correction factor current source configured to apply a magnitude to the corresponding DFE tap-weighted current.

14. The apparatus of claim 10, further comprising a current buffer connected between the first analog current summation bus and the first data decision circuit.

15. The apparatus of claim 10, further comprising a data decision history element configured to provide additional DFE tap-weighted currents to the first analog current summation bus.

16. The apparatus of claim 10, wherein the data output decision value is determined based on a combination of the received input data voltage with the aggregate DFE correction current signal at a differential output node.

17. The apparatus of claim 16, further comprising a pair of resistors configured to generate a combined output voltage by drawing a data current signal representative of the received input data voltage and the aggregate DFE correction current signal through the pair of resistors.

18. The apparatus of claim 17, further comprising an input differential pair of transistors connected to the differential output node and configured to receive the input data voltage and to responsively generate the data current signal.

* * * * *